US012748898B1

(12) United States Patent
Chauhan et al.

(10) Patent No.: US 12,748,898 B1
(45) Date of Patent: Sep. 29, 2026

(54) DEVICE-BASED ANTI-THEFT AND RECOVERY SYSTEM

(71) Applicant: Google LLC, Mountain View, CA (US)

(72) Inventors: Sudeep Chauhan, Antioch, CA (US); Ehsan Nourbakhsh, San Francisco, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 19/091,165

(22) Filed: Mar. 26, 2025

(51) Int. Cl.
*G06F 21/88* (2013.01)
*G06F 21/62* (2013.01)

(52) U.S. Cl.
CPC .......... *G06F 21/88* (2013.01); *G06F 21/6218* (2013.01)

(58) Field of Classification Search
CPC .. G06F 21/51; G06F 21/62–629; G06F 21/74; G06F 21/88; H04L 63/0853
See application file for complete search history.

(56) References Cited

U.S. PATENT DOCUMENTS

2010/0229248 A1 9/2010 Glave
2011/0154478 A1 6/2011 Chew
2012/0124388 A1* 5/2012 Chng .................... G06Q 30/06 713/189
2014/0282877 A1* 9/2014 Mahaffey ............. H04W 12/33 726/3
2014/0373184 A1 12/2014 Mahaffey et al.
2016/0034699 A1* 2/2016 Sasaki .................. H04W 4/029 726/27
2016/0224810 A1* 8/2016 Shahidzadeh ....... H04W 12/126
2018/0247506 A1 8/2018 Hong
2023/0385463 A1 11/2023 Raju
2024/0054208 A1 2/2024 Yin et al.
2024/0205327 A1 6/2024 Xie

FOREIGN PATENT DOCUMENTS

WO 2016072833 A1 5/2016

OTHER PUBLICATIONS

Apple Inc., "Apple Watch User Guide", Oct. 10, 2024, 292 pp.
Apple Support, "Unpair and erase your Apple Watch", Sep. 16, 2024, 3 pp.
Extended Search Report from counterpart European Application No. 26156007.2 dated Apr. 22, 2026, 9 pp.

* cited by examiner

*Primary Examiner* — Kevin Bechtel
(74) *Attorney, Agent, or Firm* — Shumaker & Sieffert, P.A.

(57) ABSTRACT

Device-based anti-theft and recovery techniques for computing devices are disclosed herein. An example system includes one or more processors that execute instructions to receive, from a transferor that intends to convey the computing device to a transferee, one or more signal parameters that, if satisfied, permit the computing device to deactivate a protected mode of operation; activate, during a normal mode of operation, the protected mode, wherein the computing device disables one or more functions that are enabled during the normal mode of operation while the protected mode is activated; receive, during the protected mode, a user input from a potential transferee corresponding to a wake function of the computing device; and responsive to receiving the user input, determine, based on a comparison between one or more signals associated with the computing device and the one or more signal parameters, whether the computing device is in possession of the transferee.

20 Claims, 5 Drawing Sheets

DEVICE-BASED ANTI-THEFT AND RECOVERY SYSTEM

BACKGROUND

Mobile and other computing devices may commonly be the target of theft. To discourage theft, original equipment manufacturers (OEMs) or software ecosystem providers may provide services that allow the owner of a stolen device to remotely disable the device. When remotely disabled the stolen device is typically rendered inoperative and therefore is of little or no value as a target of theft.

SUMMARY

In general, aspects of the techniques of this disclosure are directed to device-based anti-theft and recovery systems. A computing device may be transferred between owners (e.g., sold) thereby allowing a first owner (e.g., seller, transferor) to transfer ownership to a subsequent second owner (e.g., buyer, transferee). In accordance with the techniques described herein, the computing device may implement a device-based anti-theft and recovery system to protect the device while the device is being transferred (e.g., shipped, transported) between legitimate owners (e.g., a seller and a buyer).

For example, the computing device may activate and maintain a protected mode whereby the computing device is disabled until the computing device is in the possession of the intended transferee. For instance, the computing device may be intercepted (e.g., stolen) by an unauthorized party that is not the transferee. The computing device may attempt to verify that the computing device is in the possession of the transferee. If the computing device is unable to verify that the computing device is in the possession of the transferee, the computing device may refrain from deactivating the protected mode. If the computing device verifies that the computing device is in the possession of the transferee, the computing device may deactivate the protected mode. Once the protected mode is deactivated, the computing device may enable use of previously disabled functions, such as to allow the transferee to setup, factory reset, or otherwise take ownership of the computing device.

In some aspects, the techniques described herein relate to a method including receiving, by a computing device and from a transferor that intends to convey the computing device to a transferee, one or more signal parameters that, if satisfied, permit the computing device to deactivate a protected mode of operation; activating, by the computing device and during a normal mode of operation, the protected mode, wherein the computing device disables one or more functions that are enabled during the normal mode of operation while the protected mode is activated; receiving, by the computing device and during the protected mode, a user input from a potential transferee, the user input corresponding to a wake function of the computing device; responsive to receiving the user input, determining, by the computing device and based on a comparison between one or more signals associated with the computing device and the one or more signal parameters, whether the computing device is in possession of the transferee; responsive to determining the computing device is in the possession of the transferee, deactivating, by the computing device, the protected mode of operation; and responsive to determining the computing device is not in the possession of the transferee, maintaining, by the computing device, the protected mode of operation.

In some aspects, the techniques described herein relate to a computing system including a memory that stores instructions; one or more sensors that receive one or more signals associated with the computing device; and one or more processors that execute the instructions to receive, from a transferor that intends to convey the computing device to a transferee, one or more signal parameters that, if satisfied, permit the computing device to deactivate a protected mode of operation; activate, during a normal mode of operation, the protected mode, wherein the computing device disables one or more functions that are enabled during the normal mode of operation while the protected mode is activated; receive, during the protected mode, a user input from a potential transferee, the user input corresponding to a wake function of the computing device; responsive to receiving the user input, determine, based on a comparison between the one or more signals and the one or more signal parameters, whether the computing device is in possession of the transferee; responsive to determining the computing device is in the possession of the transferee, deactivate the protected mode of operation; and responsive to determining the computing device is not in the possession of the transferee, maintain the protected mode of operation.

In some aspects, the techniques described herein relate to non-transitory computer-readable storage media including instructions, that when executed by one or more processors of a computing device, cause the one or more processors to receive, from a transferor that intends to convey the computing device to a transferee, one or more signal parameters that, if satisfied, permit the computing device to deactivate a protected mode of operation; activate, during a normal mode of operation, the protected mode, wherein the computing device disables one or more functions that are enabled during the normal mode of operation while the protected mode is activated; receive, during the protected mode, a user input from a potential transferee, the user input corresponding to a wake function of the computing device; responsive to receiving the user input, determine, based on a comparison between one or more signals associated with the computing device and the one or more signal parameters, whether the computing device is in possession of the transferee; responsive to determining the computing device is in the possession of the transferee, deactivate the protected mode of operation; and responsive to determining the computing device is not in the possession of the transferee, maintain the protected mode of operation.

The details of one or more examples of the subject matter of this specification are set forth in the accompanying drawings and the description below. Other features, aspects, and advantages of the subject matter will become apparent from the description, the drawings, and the claims.

BRIEF DESCRIPTION OF DRA WINGS

DETAILED DESCRIPTION

Figure 1:
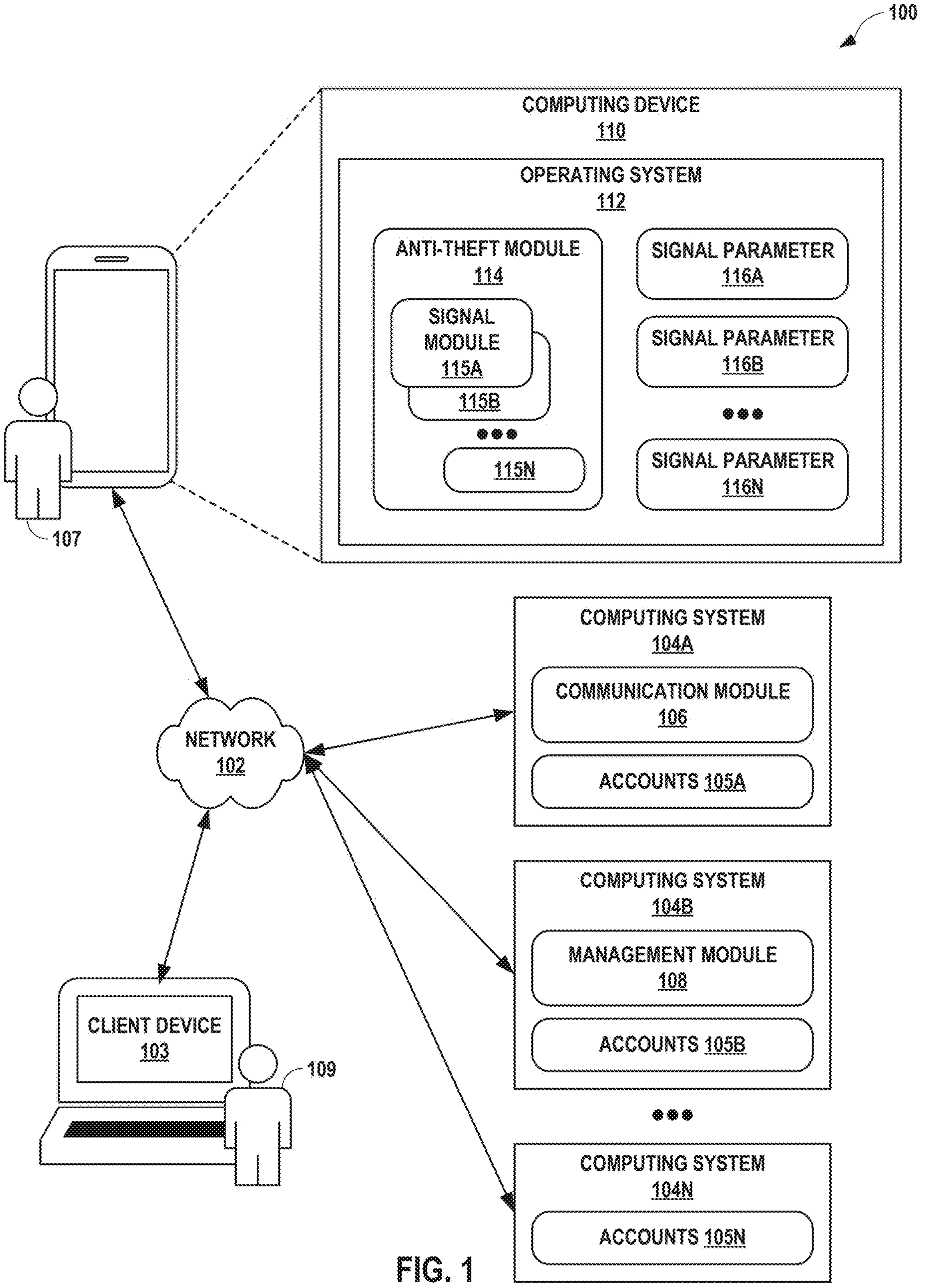
FIG. 1 is a conceptual diagram illustrating an example environment for device-based anti-theft and recovery systems, in accordance with one or more aspects of the present disclosure.

FIG. 1 is a conceptual diagram illustrating an example environment for device-based anti-theft and recovery systems, in accordance with one or more aspects of the present disclosure. As can be seen, environment 100 may include a computing device 110 and a client device 103. Computing device 110 may represent a device, owned by a transferor 107 (e.g., first owner, seller) that is to be transferred (e.g., sold) to a transferee 109 (e.g., subsequent second owner, buyer). Transferor 107 and transferee 109 may be various parties, including individuals as well as retailers, couriers, shipping companies, logistics companies, transportation companies, or other entities.

In some examples, computing device 110 may be transferred from transferor 107 to transferee 109 by virtue of a sale, gift, buy now pay later (BNPL) or other financed transaction, credit transaction, or other conveyance. Transferee 109 may utilize client device 103 to arrange the transfer of computing device 110 from transferor 107. Transferor 107 and transferee 109 may arrange the transfer of computing device 110 using their respective devices (e.g., computing device 110 and client device 103), through one or more computing systems 104A-104N (collectively, "computing systems 104") of environment 100, or both. Computing device 110, client device 103, and computing systems 104 may communicate through a network 102.

FIG. 1 illustrates a particular example of computing device 110, and many other examples of computing device 110 may be used in other instances and may include a subset of the components included in computing device 110 or may include additional components not shown in FIG. 1. Some examples of computing device 110 include a mobile phone, a tablet computer, a laptop computer, a wearable device, a gaming system, a media player, an e-book reader, or any other type of computing device that may operate in accordance with the present disclosure.

Computing device 110 may include operating system 112. Computing device 110 may execute operating system 112 to perform various actions or functions. For example, computing device 110 may execute operating system 112 to provide an execution environment for an anti-theft module 114. Computing device 110 may execute anti-theft module 114 to perform the device-based anti-theft and recovery techniques described herein. For example, computing device 110 may execute anti-theft module 114 to activate a protected mode of computing device 110, deactivate the protected mode.

The protected mode, if activated by anti-theft module 114, may cause computing device 110 to enable (e.g., allow, activate) execution of a subset of functions of computing device 110 and disable (e.g., disallow, deactivate, prevent, block) execution of the remaining functions of computing device 110. For example, anti-theft module 114 may activate the protected mode to enable execution of anti-theft and recovery functions such as location tracking (e.g., global navigation satellite system (GNSS), WI-FI, cellular location tracking), video recording, and audio recording, or various subsets thereof. Anti-theft module 114 may enable communication functionality, such as through one or more wired or wireless communication devices (e.g., Ethernet, WI-FI, cellular transceivers) while the protected mode is activated to allow computing device 110 to transmit protected mode information collected by computing device 110 while operating in the protected mode. For example, anti-theft module 114 may communicate protected mode information such as location, video, audio, and other information captured (e.g., recorded, detected) during protected mode operation. In this manner, information collected while computing device 110 is operating in the protected mode may be shared with the owner (e.g., transferor 107) of computing device 110, the manufacturer of computing device 110, law enforcement, or other parties, such as through network 102 and/or one or more of computing systems 104. Anti-theft and recovery functions may include the same or different sets of one or more functions that provide anti-theft and/or recovery functions (e.g., location tracking, video recording, audio recording, communicating protected mode information).

Anti-theft module 114 may activate the protected mode to disable execution of protected mode functions of computing device 110. Protected mode functions may include functions other than the anti-theft and recovery functions. For instance, anti-theft module 114 may disable one or more setup functions (e.g., a device setup wizard) used to setup computing device 110 for a user (e.g., a different user than transferor 107), one or more factory reset functions used to reset computing device 110 to original factory settings, and one or more use functions that permit computing device 110 to be used normally (e.g., for running downloaded applications, messaging, social networking, gaming, streaming or other entertainment), or various subsets thereof. By disabling such protected mode functions, anti-theft module 114 prevents computing device 110 from being fully functional. In this manner, anti-theft module 114 may provide factory reset protection at computing device 110.

Once the protected mode is activated, computing device 110 may maintain the protected mode until anti-theft module 114 determines computing device 110 is in the possession (e.g., physical possession, physical control) of transferee 109. For example, anti-theft module 114 may refrain from deactivating the protected mode until anti-theft module 114 verifies that computing device 110 is in the possession of transferee 109 as compared to another party that is not transferee 109. If anti-theft module 114 verifies that computing device 110 is in the possession of transferee 109, anti-theft module 114 may deactivate the protected mode. As indicated above, if the protected mode is deactivated, transferee 109 may invoke one or more setup functions, factory reset functions, and/or use functions that were disabled while the protected mode was activated.

Anti-theft module 114 may include and/or use one or more signal modules 115A-115N (collectively, "signal modules 115"), one or more signal parameters 116A-116N (collectively, "signal parameters 116"), or both that are used to verify that computing device 110 is in the possession of transferee 109. As will be described further below, a signal module of signal modules 115 may process one or more signals using one or more of signal parameters 116 to determine whether the one or more signals indicate whether computing device 110 is in the possession of transferee 109. For example, a signal module of signal modules 115 may compare a signal to one or more signal parameters of signal parameters 116 such as to determine whether the signal indicates computing device 110 is in the possession of transferee 109. For instance, the signal may indicate computing device 110 is in the possession of transferee 109 if the signal satisfies (e.g., matches and/or exceeds, matches and/or does not exceed) the one or more signal parameters. Signal modules 115 may represent software modules executable by computing device 110, such as by a processor of computing device 110. In some examples, signal modules

115 may be implemented in hardware, such as through processing or other circuitry of a processor or other hardware element of computing device 110.

Anti-theft module 114 may verify that computing device 110 is in the possession of transferee 109 based on the processing of signals relative to signal parameters 116. If anti-theft module 114, such as through one or more of signal modules 115, determines one or more signals provide a sufficient indication that computing device 110 is in the possession of transferee 109, anti-theft module 114 may verify that computing device 110 is in the possession of transferee 109. For example, anti-theft module 114 may verify that computing device 110 is in the possession of transferee 109 if signal modules 115 determine that one or more of the signals match one or more of signal parameters 116. In response to such verification, anti-theft module 114 may allow the protected mode of computing device 110 to be disabled, such as by transferee 109, or may automatically disable the protected mode. As part of disabling the protected mode, anti-theft module 114 may enable one or more protected functions to render computing device 110 fully functional, such as to allow transferee 109 to setup, factory reset, or otherwise take ownership of the computing device.

Some examples of signals that signal modules 115 may process include location-based signals, network-based signals, account-based signals, time-based signals, biometric signals, and device-specific signals. Location-based signals may include GNSS coordinates or other location information that identifies a location. A signal module of signal modules 115 may compare a location identified in a location-based signal to a signal parameter of signal parameters 116 to determine whether computing device 110 is at the location identified in the signal parameter. The signal parameter may, for example, correspond to location coordinates (e.g., GNSS coordinates), a geofence (e.g., a virtual perimeter around a particular location), or other location identifier. In this example, the signal parameter may represent a "safe" location where it may be assumed that computing device 110 is in possession of transferee 109 (e.g., an office or home location of transferee 109). The signal module may determine whether the location-based signal satisfies the signal parameter. For example, the signal module may determine a location-based signal satisfies the signal parameter if the location-based signal identifies a location that matches that of the signal parameter. For instance, the signal module may determine the location-based signal satisfies the signal parameter if the location-based signal is at or within a predefined vicinity (e.g., geofence, predefined range) indicated by the signal parameter.

Signal modules 115 may receive and process various types of location-based signals. For example, in addition to GNSS coordinates, location-based signals may include cellular, WI-FI, BLUETOOTH, or other long- or short-range radio frequency signals sufficient to allow a location to be determined, such as through triangulation or other suitable techniques. For instance, computing device 110, such as through anti-theft module 114, may determine a current location of computing device 110 by performing cell tower triangulation using cellular signals, WI-FI hotspot triangulation through WI-FI signals (e.g., through a WI-FI positioning system (WPS)), or other range finding or location determination techniques which may be based on BLUETOOTH, ultra-wideband (UWB) or other long or short range radiofrequency signals. Computing device 110 may determine the location of computing device 110 through various signal strength, triangulation, or other suitable range and/or location determination techniques. In some examples, computing device 110 may include preloaded locations of known signal sources (e.g., WI-FI hotspots, cell towers, BLUETOOTH beacons), such as to perform offline triangulation, verification of an expected location, or the like.

A signal module of signal modules 115 may compare a signal including a current location of computing device 110 to a safe location included in a signal parameter of signal parameters 116. As described above, the safe location may be a location corresponding to transferee 109 (e.g., an office or home of transferee 109) where it is likely that devices at such a location are in possession of transferee 109. The signal module may determine that the signal parameter is satisfied if the current location matches the safe location, which indicates computing device 110 is at the safe location. Accordingly, the signal module may determine the signal indicates computing device 110 is in the possession of transferee 109. With respect to a geofence, a signal module of signal modules 115 may compare the signal including the current location of computing device 110 to one or more of signal parameters 116 that define the perimeter of the geofence. In this example, the signal module may determine that the one or more signal parameters are satisfied, and therefore that the signal indicates computing device 110 is in possession of transferee 109, if the location of computing device 110 is within the vicinity (e.g., perimeter) of the geofence.

Examples of network-based signals may include network identifiers (e.g., WI-FI service set identifiers (SSIDs)), network addresses (e.g., WI-FI or BLUETOOTH media access control (MAC) addresses, Internet Protocol (IP) addresses), proximity information (e.g., BLUETOOTH or UWB proximity to a particular device), WI-FI network profiles and/or parameters, or the like. A signal module of signal modules 115 may compare such network-based signals to one or more of signal parameters 116 and determine whether respective signals indicate computing device 110 is in possession of transferee 109 based on such comparison. For example, a signal module of signal modules 115 may compare a signal including a network identifier (e.g., SSID) for a network that computing device 110 is connected or that computing device 110 detects (e.g., is within range of) to with a network identifier included in a signal parameter of signal parameters 116. The network identified included in the signal parameter may represent a "safe" network that indicates computing device 110 is in possession of transferee 109 (e.g., a WI-FI or other network or device belonging to transferee 109). The signal module may determine the signal including the network identifier indicates computing device 110 is in the possession of transferee 109 if the signal parameter is satisfied. For example, the signal module may determine the signal indicates computing device 110 is in the possession of transferee 109 if the network identifier for the network (e.g., network name) matches the network identifier included in the signal parameter.

As another example, a signal module of signal modules 115 may compare a signal including a network address for a device (e.g., BLUETOOTH device, UWB device) that computing device 110 is connected to or that computing device 110 detects with a network address included in a signal parameter of signal parameters 116. The signal module may determine the signal indicates computing device 110 is in the possession of transferee 109 if the signal parameter is satisfied (e.g., if the network address included in the signal matches the network address included in the signal parameter). In this example, the network address included in the signal parameter may represent a "safe"

device (e.g., a device belonging to transferee 109). As compared to a network identifier, one or more of signal parameters 116 that include a network address may have a higher specificity in that the network address (e.g., MAC address) may identify a particular device (e.g., WI-FI router, paired BLUETOOTH or other device) rather than a network.

In some examples, a network address (e.g., an Internet protocol (IP) address) from a signal may indicate the location of computing device 110. In these examples, a signal module of signal modules 115 may determine a location of computing device 110 based on the network address from the signal. For example, the signal module may query, with the network address, a repository (e.g., database) that maps network addresses (e.g., IP addresses) to known locations (e.g., GNSS coordinates for known network access point devices). The signal module may determine whether the computing device 110 is at a "safe" location and therefore that the signal indicates computing device 110 is in the possession of transferee 109 if the location matches a location included in a signal parameter of signal parameters 116.

A network-based signal may include proximity information (e.g., receive signal strength indication (RSSI)) that indicates the distance between computing device 110 and a particular device. A signal module of signal modules 115 may compare the distance (e.g., 100 meters (m), 10 m) between computing device 110 and the particular device to a signal parameter of signal parameters 116. The signal module may determine the signal parameter is satisfied, and therefore the signal indicates computing device 110 is in the possession of transferee 109, if the distance satisfies a threshold distance (e.g., 100 m, 10 m) included in the signal parameter. In addition to including the threshold distance, one or more of signal parameters 116 may include a device identifier (e.g., MAC address, serial number) that identifies the particular device. In this example, the particular device may represent a "safe" device (e.g., a mobile computing or other suitable device of transferee 109) that, if computing device 110 is within the threshold distance of the particular device, indicates computing device 110 is in the possession of transferee 109.

The signal module may compare the device identifier included in the signal to the device identifier in a signal parameter of signal parameters 116 to determine whether computing device 110 is within the proximity of the particular device. In this manner, the signal module ensures the signal is from the particular device identified in the signal parameter as compared to another device that is not the particular device. The signal module may subsequently determine whether the distance in the signal satisfies the threshold distance from the signal parameter. The signal module may determine the signal indicates computing device 110 is in the possession of transferee 109 if the signal indicates a distance between computing device 110 and the particular device that satisfies (e.g., meets and/or does not exceed) the threshold distance from the signal parameter.

In some environments, such as an enterprise network environment, devices connected to a network may use WI-FI profiles including attached certificates, such as those used in 802.1X. The certificate chain of these certificates may be a strong indication that computing device 110 is being set up in the correct environment. As such, a network-based signal may identify a "safe" environment, such as by including a key, signature, or other certification information from a certificate, certificate chain, or the like for a network corresponding to transferee 109 (e.g., a work network of transferee 109). A signal module of signal modules 115 may compare the certification information from the network-based signal to verification information from a signal parameter of signal parameters 116 and determine the signal indicates computing device 110 is in the possession of transferee 109 if the certification information in the signal matches the certification information from the signal parameter.

Anti-theft module 114 may use account-based signals in some examples. For instance, a signal module of signal modules 115 may compare a password, personal identification number (PIN), token or other "secret" code to a secret code from a signal parameter of signal parameters 116. To illustrate, computing device 110 may output a prompt, such as through a user interface device, that prompts a current user of computing device 110 to input the secret code. Computing device 110 may receive the secret code from the current user (that is potentially also the transferee 109) and the signal module may compare such secret code to the secret code from the signal parameter. If the signal module determines the received secret code matches the secret code from the signal parameter, the signal module may determine the account-based signal indicates computing device 110 is in possession of transferee 109. In some examples, a signal parameter of signal parameters 116 may include expiration information (e.g., expiration time) for the secret code. The signal module may refrain from using the secret code to determine whether computing device 110 is in the possession of transferee 109 if the signal module determines, based on the expiration information, that the secret code has expired. In this manner, the secret code may represent a short-lived temporary authentication token as compared to a long-lived secret code which may not expire. For example, the secret code may be assigned to expiration information that causes the secret code to expire based on an estimated time for transferee 109 to receive computing device 110 (e.g., shipping time).

To establish (e.g., setup) the secret code in the signal parameter, anti-theft module 114 may originally receive the secret code from transferor 107 or generate the secret code, such as in response from a command to generate the secret code from transferor 107. Anti-theft module 114 may maintain the signal parameter at computing device 110, such as on a storage device thereof, even if computing device 110 is reset (e.g., all user generated content is erased from computing device 110). In this manner, the secret code may be used to determine whether computing device 110 is in the possession of transferee 109 regardless of whether a user account or other data of transferor 107 is erased from computing device 110 prior to transferring (e.g., shipping) computing device 110 to transferee 109. In some examples, rather than receiving the secret code from transferor 107, the secret code may be embedded in one or more hardware elements of computing device 110. In some examples, such an embedded secret code may represent a device-specific signal parameter, which a signal module of signal modules 115 may compare to a signal to determine whether the signal indicates computing device 110 is in the possession of transferee 109. For example, the signal module may compare a signal including a secret code inputted by a current user to the embedded secret code to determine whether the signal indicates computing device 110 is in the possession of transferee 109.

Transferee 109 may obtain the secret code in various ways. For example, transferor 107 may provide the token to transferee 109, such as through communication with transferee 109 (e.g., email, phone call, text message) via respective devices of transferor 107 and transferee (e.g., computing device 110, client device 103). In another example, transferee 109 may obtain the secret code through a trusted courier (e.g., a courier with a previously registered near field communication (NFC) tag. For instance, a device of transferor 107 (e.g., computing device 110) may transfer the secret code to a device (e.g., mobile device, computer) of the trusted courier, such as when the device of transferor 107 is tapped against the trusted courier's device. The trusted courier's device may, in turn, transfer the secret code to a device (e.g., client device 103) of transferee 109, such as when the trusted courier's device is tapped against the device of transferee 109. The device of transferee 109 may present the secret code to transferee 109 such as to allow transferee 109 to provide (e.g., input) the secret code to computing device 110, or the device of transferee 109 may transmit the secret code to computing device 110. A signal module of signal modules 115 at computing device 110 may compare a signal including the received secret code to a secret code from a signal parameter of signal parameters 116 to determine whether the signal indicates computing device 110 is in the possession of transferee 109. For example, the signal module may determine the signal indicates computing device 110 is in the possession of transferee 109 if the received secret code matches the secret code from the signal parameter.

As another example, a computing system of computing systems 104 may provide the secret code to transferee through a user account of transferee 109. For example, the computing system may receive or generate the secret code in response to user input received through a user account of transferor 107. The computing system may transfer (e.g., assign) the secret code to the user account of transferee 109. As such, if transferee 109 logs in or otherwise authenticates access to the transferee's user account through computing device 110, a signal module of signal modules 115 may retrieve a signal including the secret code from the computing system. The signal module may compare the secret code from the signal to a secret code from a signal parameter of signal parameters 116 previously stored to computing device 110. The signal module may determine the signal indicates computing device 110 is in the possession of transferee 109 if the secret code from the signal matches the secret code from the signal parameter. In some examples, anti-theft module 114, such as through the computing system, may automatically assign computing device 110 to the user account of transferee 109 if the secret code from the signal matches the secret code from the signal parameter.

Anti-theft module 114 may use time-based signals, such as a time window. For example, a signal module of signal modules 115 may compare a signal including a current time for computing device 110 determined from a clock, GNSS sensor, or other timing implement of computing device 110 to a time window (e.g., 48 hours) or other timing information included in a signal parameter of signal parameters 116. The signal parameter may include an indication of an anchoring time (e.g., start time, end time) for the time window. For example, the signal parameter may include a time window relative to an anchoring time, where the anchoring time corresponds to a delivery time of computing device 110 (e.g., within 48 hours of delivery of computing device 110 to a delivery location by a shipping or other courier). In this manner, unauthorized setup of computing device 110 can be prevented, such as if the shipment of computing device 110 is delayed or intercepted. In some examples, the signal module may determine the anchoring time based on one or more signals. For example, the signal module may determine computing device 110 has been delivered if one or more signals (e.g., location-based signals, network-based signals, etc.) indicate computing device 110 is at the delivery location.

Subject to obtaining user approval and in accordance with user privacy preferences and/or settings, a signal module of signal modules 115 may utilize biometric signals to determine whether computing device 110 is in the possession of transferee 109. For example, the signal module may compare a fingerprint, voice print, voice recognition, facial or other biometric data received by computing device 110, such as a sensor thereof, to biometric data included in a signal parameter of signal parameters 116. The signal module may determine the signal indicates computing device 110 is in the possession of transferee 109 if the received biometric data from the signal matches the biometric data from the signal parameter.

Though generally described above in the context of a signal module of signal modules 115 processing (e.g., comparing) a particular signal, individual signal modules 115 may process one or more signals. For example, rather than signal module 115A processing a first signal, signal module 115B processing a second signal, signal module 115N processing nth signal, and so on and so forth, one or more of signal module 115A, signal module 115B, or signal module 115N may each process multiple signals. For instance, rather than only processing a particular type of signal, a signal module of signal modules 115 may process multiple types of signals. To illustrate, rather than processing particular signals (e.g., location-based signals), signal module 115A may process location-based signals as well as network-based signals, account-based signals, time-based signals, biometric signals, and device-specific signals, other signals or various subsets thereof. Though illustrated in the example of FIG. 1 as including a particular number of signal modules 115, anti-theft module 114 may include fewer or additional signal modules 115.

Anti-theft module 114 may perform a weighted assessment of signals to verify whether computing device 110 is in the possession of transferee 109. The weighted assessment may verify whether computing device 110 is in the possession of transferee 109 based on comparison(s) between one or more signals relative to (e.g., compared with) one or more of signal parameters 116 performed by one or more of signal modules 115. For example, individual signal parameters of signal parameters 116 may be assigned a weight which may represent the likelihood (e.g., strength, confidence level) that signals which satisfy these signal parameters indicate computing device 110 is in the possession of transferee 109. Anti-theft module 114 may combine weights from signal parameters 116 and verify that computing device 110 is in the possession of transferee 109 if the combined weight (e.g., sum of weights) satisfies (e.g., meets and/or exceeds, meets and/or does not exceed) a threshold weight. Conversely, anti-theft module 114 may refrain from verifying (e.g., not verify) that computing device 110 is in the possession of transferee 109 if the combined weight does not satisfy the threshold weight.

For example, signal parameter 116A may include a network identifier or network name (e.g., SSID, MAC address) and an assigned weight (e.g., 0.2, 0.3, 0.5, etc.), signal parameter 116B may include a location (e.g., geofence) and an assigned weight, and signal parameter 116N may include a secret code and an assigned weight, and so on and so forth. Anti-theft module 114 may combine (e.g., sum) the weight of each of signal parameters 116A, 116B, 116N that is satisfied by a corresponding signal. Anti-theft module 114 may determine whether the combined weight satisfies the threshold weight. Anti-theft module 114 may verify whether computing device 110 is in the possession of transferee 109 if the combined weight satisfies the threshold weight. Anti-theft module 114 may refrain from including, in the combined weight (e.g., the sum), any weights from any of signal parameters 116 that are not satisfied or replace these weights with a zero value to prevent these weights from affecting (e.g., increasing) the combined weight.

For example, signal parameter 116A may include a network identifier (e.g., SSID) and a weight of 0.4, signal parameter 116B may include an IP address and a weight of 0.2. Assuming anti-theft module 114 includes a threshold weight of 0.6, anti-theft module 114 may determine the threshold weight is satisfied if both signal parameter 116A and signal parameter 116B are satisfied in that the weight of 0.4 from signal parameter 116A plus the weight of 0.2 from signal parameter 116B meets or exceeds the weight threshold of 0.6. Alternatively, if signal parameter 116A, signal parameter 116B, or both are not satisfied, anti-theft module 114 may determine the threshold weight is not satisfied in that, in this example scenario, the combined weight cannot meet or exceed the threshold weight.

As another example, signal parameter 116A may include a voice print and a weight of 0.2 and signal parameter 116B may include a time window and a weight of 0.2. In this example, at least one other signal parameter of signal parameters 116 must be satisfied to satisfy the threshold weight of 0.6 in that the weights of signal parameter 116A and signal parameter 116B, even if both are satisfied, have a maximum weight of 0.4. If anti-theft module 114 determines a combined weight does not satisfy a threshold weight, anti-theft module 114 may refrain from verifying computing device 110 is in the possession of transferee 109. Continuing this example, signal parameter 116N may include a secret code and a weight of 0.4. As such, assuming signal parameter 116N is satisfied and signal parameter 116A, signal parameter 116B, or both are satisfied, anti-theft module 114 may determine the combined weight (of either 0.6 or 0.8) satisfies the weight threshold of 0.6. Accordingly, anti-theft module 114 may then verify that computing device 110 is in the possession of transferee 109. In some examples, if anti-theft module 114 determines the threshold weight is not satisfied, anti-theft module 114 may prompt the current user of computing device 110 to enter the secret code, such as to attempt to add to the combined weight by adding the weight assigned to the secret code to the combined weight. In this manner, anti-theft module 114 may attempt to increase the combined weight to (at least potentially) satisfy the threshold weight.

In some examples, one or more of signal parameters 116 may include a weight sufficient to satisfy the weight threshold alone. As such, a "combined weight" may be a single weight in some circumstances. For example, a location-based signal may be considered a reliable indicator of computing device 110 being possessed by transferee 109. For instance, signal parameter 116A may include a location and a weight of 0.6. As such, if signal parameter 116A is satisfied, anti-theft module 114 may determine the threshold weight of 0.6, in this example, is satisfied. Anti-theft module 114 may accordingly verify that computing device 110 is in the possession of transferee 109 based only on determining signal parameter 116A is satisfied.

As described above, anti-theft module 114 may verify that computing device 110 is in the possession of transferee 109 based on one or more of signal parameters 116. As such, the individual examples herein of one or more of signal modules 115 processing (e.g., comparing) a signal relative to a signal parameter of signal parameters 116 may be performed by one or more of signal processors 116 as part of one or more weighted assessments.

Anti-theft module 114 may receive and/or store various signal parameters 116, such as to a storage device of computing device 110. For example, anti-theft module 114 may receive verification information from transferee 109 and store the verification information in one or more of signal parameters 116 at computing device 110. The verification information may include reference values suitable for use by signal modules 115 as signal parameters 116. For example, signal modules 115 may use verification information in signal parameters 116 to process (e.g., compare) various signals (e.g., location-based signals, network-based signals, account-based signals, time-based signals, biometric signals, and device-specific signals). As such, signal parameters 116 may include numerical, alphanumeric, binary, mathematical or other models, or other verification information that signal modules 115 may compare against a corresponding signal.

In general, a signal parameter of signal parameters 116 may correspond to the data type of the corresponding signal to allow signal modules 115 to process (e.g., compare) the signal parameter to the corresponding signal. For example, signal parameter 116A may include location coordinates suitable for comparison with coordinates from a location-based signal (e.g., GNSS signal). As another example, signal parameter 116B may include network information, such as a network name or a network address suitable for comparison with an SSID or MAC address, respectively, from a network-based signal. As yet another example, signal parameter 116N may include a distance (e.g., 100 m, 10 m) suitable for comparison with proximity information (e.g., RSSI) from a location-based signal. In some examples, signal modules 115 may transform one or more of signal parameters 116 and/or corresponding signals prior to comparing the signal parameters to the corresponding signals. For instance, signal modules 115 may convert the one or more signal parameters and/or signals to compatible (e.g., the same) units of measure, data types, or the like such that the one or more signal parameters and corresponding signals can be meaningfully compared to determine an indication of whether computing device 110 is in the possession of transferee 109.

As described above, environment 100 may include one or more of computing systems 104. A computing system of computing systems 104 may host (e.g., implement) one or more communication, online marketplace, device management, or other services that transferor 107 and transferee 109 may access through their respective devices (e.g., computing device 110 and client device 103), such as through network 102. One or more of computing systems 104 may facilitate verification that computing device 110 is in the possession of transferee 109 to permit transferee 109 to take ownership of computing device 110. Computing systems 104 may be examples of computing systems 104 provided by various parties. As such, the device-based anti-theft and recovery techniques described herein may be used with a variety of independent manufacturers, vendors, service providers, or other parties.

Computing systems 104 may represent any suitable computing device or system, such as one or more desktop computers, laptop computers, mainframes, servers, cloud computing systems, virtual machines, etc. capable of communicating (e.g., sending and receiving) information with devices of transferor 107 and transferee 109 (e.g., computing device 110, client device 103), such as through network 102.

In some examples, one or more of computing systems 104 may represent one or more cloud computing systems that provide one or more services via network 102. That is, in some examples, one or more of computing systems 104 may be distributed computing systems. Devices of transferor 107 and transferee 109, such as computing device 110, client device 103, or both may access cloud or other services by communicating with one or more of computing systems 104. Examples of client device 103 include a mobile phone, a tablet computer, a laptop computer, a wearable device, a gaming system, a media player, an e-book reader, or any other type of computing device that may operate in accordance with the present disclosure.

Though shown each with a single device (e.g., computing device 110 and client device 103), transferor 107, transferee 109, or both may use multiple devices in connection with the device-based anti-theft and recovery techniques described herein. For example, after transferor 107 surrenders control of computing device 110, such as to ship computing device to transferee 109, transferor 107 may utilize another device to interact with transferee 109, client device 103, and one or more of computing systems 104, or various subsets thereof. Transferor 107 may use such other device for various purposes. For example, transferor 107 may use another device to receive protected mode information from computing device 110, such as through one or more of computing systems 104, in the event computing device 110 is intercepted by a party that is not the transferee 109. For example, transferor 107 may receive protected mode information including location of computing device at the other device. In some examples, transferor 107 may cause computing device 110 to emit an audible or other alarm, present contact information for transferor 107, or the like, such as to encourage the return of computing device 110 to transferor 107.

Network 102 may represent any public or private communications network, for instance, cellular, WI-FI, and/or other types of networks, for transmitting data between computing systems, servers, and computing devices. Network 102 may include one or more network hubs, network switches, network routers, or any other network equipment, that are operatively inter-coupled thereby providing for the exchange of information between computing device 110, client device 103, one or more of computing system 104, or various subsets thereof. Computing device 110, client device 103, and computing systems 104 may transmit and receive data across network 102 using any suitable communication techniques. Each of computing device 110, client device 103 and computing systems 104 may be operatively coupled to network 102 using respective network links, such as Ethernet, WI-FI, cellular, or any other types of wired and/or wireless network connections. Computing device 110 may communicate the verification information, protected mode information, and/or other data described herein with other devices, including client device 103, computing systems 104, network devices of network 102 using one or more encrypted communication channels.

In some examples, computing systems 104 may include one or more processors, one or more communication devices, and one or more memory devices. A memory device of a computing system of computing systems 104 may include an operating system, which may provide an execution environment for various modules that, when executed by one or more processors, provide the one or more services hosted by the computing system. The memory device of the computing system 104 may include a data store that stores various data, such as in a structured or unstructured format, used during the operation of the one or more services.

FIG. 1 illustrates some examples of computing systems 104. For instance, computing system 104A may represent a computing system that hosts one or more communication (e.g., messaging, social networking services) or online marketplace services (e.g., e-commerce platforms), computing system 104B may represent a computing system that hosts one or more device management services (e.g., application stores, mobile device management (MDM) services, information technology (IT) services), and computing system 104N may represent a computing system that hosts courier (e.g., parcel delivery) services. As can be seen, individual computing systems 104 may manage (e.g., store, create, update, delete) distinct user or other accounts 105A-105N (collectively, "accounts 105"). As shown in the example of FIG. 1 for instance, computing system 104A manages accounts 105A, computing system 104B manages accounts 105B, and computing system 104N manages accounts 105N.

Anti-theft module 114 may be agnostic to various computing systems 104. As such, anti-theft module 114 may provide the device-based anti-theft and recovery techniques described herein regardless of whether computing systems 104 are provided by the same or distinct providers. For example, computing system 104A may be provided by an e-commerce or auction services company, computing system 104B may be provided by a device manufacturer (e.g., original equipment manufacturer (OEM), and computing system 104N may be provided by a shipping or logistics company, one or more of which may be independent and distinct entities.

One or more of computing systems 104 may manage accounts 105 (e.g., user accounts) for communication, social networking, e-commerce, device management, courier or other services provided by respective computing systems 104. For example, computing systems 104 may create respective accounts 105 for transferor 107 and transferee 109, such as in response to receiving sign up information (e.g., name, email, username, password) from transferor 107 and transferee 109. A computing system of computing systems 104 may store respective user accounts 105 to a storage device of the computing system. Thereafter, transferor 107 and transferee 109, such as through their respective devices (e.g., computing device 110, client device 103), may access (e.g., use) the one or more services provided by the computing system, such as to facilitate the transfer of computing device 110 from transferor 107 to transferee 109. One or more of computing systems 104 may allow users (e.g., transferor 107 and transferee 109) to discover, find, and communicate with one another through respective accounts of the one or more computing systems 104.

Computing system 104A may include communication module 106 that provides communication services between accounts 105A of computing system 104A. Anti-theft module 114 may use computing system 104A to receive verification information that anti-theft module 114 may use to verify whether computing device 110 is in the possession of transferee 109. For instance, transferee 109 may send location information (e.g., GNSS coordinate, geofence), network information (e.g., network name, MAC address, device identifier, IP address), one or more secret codes, biometric data (e.g., mathematical fingerprint, voice print, or other models), or other verification information from client device 103 to communication module 106 of computing system 104A. Communication module 106 may send the verification information to transferor 107, such as by sending the verification information to computing device 110.

Computing device 110 may receive and/or store the verification information as one or more of signal parameters 116. In some examples, computing device 110 may present the verification information to transferor 107 and transferor 107 may input the verification information into computing device 110. Anti-theft module 114 may store the verification information to a storage device of computing device 110 as one or more of signal parameters 116. For example, transferor 107 may input location information, network information, one or more secret codes, or other verification information received from transferee 109 into computing device 110. For instance, computing device 110 may store the location information as coordinates or a geofence, the network information as a network name, MAC address, device identifier, or IP address, the one or more secret codes, or various subsets thereof in one or more of signal parameters 116.

Transferor 107 and transferee 109 may set up respective accounts of accounts 105A at computing system 104A to use in communicating the verification information as described above. For example, transferee 109 may use a transferee account of accounts 105A, that is assigned to transferee 109, to send the verification information to a transferor account of accounts 105A assigned to transferor 107. In some examples, in addition to facilitating communication of verification information, computing system 104A may allow transferor 107 and transferee 109 to negotiate and/or agree upon a price or other exchange or otherwise communicate regarding the transfer of computing device 110 from transferor 107 to transferee 109 through video, audio, text, or other suitable communication techniques.

Computing system 104B may include management module 108 that provides device management services. As can be seen from the example of FIG. 1, computing system 104B may include its own accounts, accounts 105B. Users of computing system 104B (e.g., transferor 107 and transferee 109) may use respective accounts of accounts 105B to register their respective devices with management module 108 of computing system 104B. For example, transferor 107 may register computing device 110 with management module 108 by sending a device identifier of computing device 110 to management module 108. Management module 108 may assign computing device 110 to a transferor account of accounts 105B assigned to transferor 107 in response to receiving the device identifier, thereby registering computing device 110 with the transferor account. In some examples, management module 108 may receive verification information from transferee 109, such as through a transferee account of accounts 105B assigned to transferee 109. Management module 108 may cause anti-theft module 114 of computing device 110 to store the verification information from transferee 109 to a storage device of computing device 110 as one or more of signal parameters 116, such as by sending the verification information to anti-theft module 114.

In addition to communicating verification information between transferee 109 and transferor 107, management module 108 may implement account-based techniques that anti-theft module 114 may rely upon to verify whether computing device 110 is in the possession of transferee 109. For example, management module 108 may receive a secret code included in a signal parameter of signal parameters 116 stored to computing device 110. Management module 108 may assign the secret code to a transferee account of accounts 105B assigned to transferee 109, such as in response to user input from transferor 107 that authorizes such an assignment. After transferee 109 receives computing device 110 as part of the transfer of computing device 110 from transferor 107 to transferee 109, transferee 109 may access (e.g., sign in) to the transferee account to retrieve the secret code. Transferee 109 may input the secret code to computing device 110. Anti-theft module 114 may detect such input as a signal including the secret code and may, such as through one or more of signal modules 115, compare the secret code from the signal to the secret code from the signal parameter stored to computing device 110 to verify whether computing device 110 is in the possession of transferee. In some examples, rather than transferee 109 inputting the secret code, transferee 109 may sign in to the transferee account and management module 108 may transmit the secret code assigned to the transferee account to anti-theft module 114. Anti-theft module 114 may detect such transmission as a signal including the secret code and automatically compare, such as through one or more of signal modules 115, the secret code forms the signal with the secret code from the signal parameter to verify whether computing device 110 is in the possession of transferee 109.

Computing system 104N may represent an example of a computing system that provides courier or other services. Computing system 104N may include accounts 105N for users of computing system 104N (e.g., transferor 107 and transferee 109). Transferee 109 may use a transferee account of accounts 105N assigned to transferee 109 to communicate verification information to a transferor account of accounts 105N assigned to transferor 107, such as in connection with transferor 107 shipping computing device 110 to transferee. Transferor 107 may retrieve the verification information by accessing (e.g., signing in to) the transferor account and input such verification information to computing device 110. Anti-theft module 114 may receive the verification information and store the verification information to a storage device of computing device 110 as one or more of signal parameters 116. Upon delivery of computing device 110, such as to a delivery address, anti-theft module 114 may use the one or more signal parameters to verify whether computing device 110 is in the possession of transferee 109. In some examples, computing system 104N may provide communications services whereby transferor 107 may send a secret code corresponding to a secret code in a signal parameter of signal parameters 116 to transferee 109 through computing system 104N.

Transferor 107 may cause anti-theft module 114 to activate the protected mode of computing device 110 in preparation for the transfer (e.g., shipping) of computing device 110 to transferee 109. For example, prior to surrendering physical possession of computing device 110, such as to ship computing device to transferee 109, anti-theft module 114 may receive input from transferor 107, such as through a user-interface device of computing device 110, indicating that transferor 107 wishes to place computing device 110 in the protected mode. In response to such input, anti-theft module 114 may activate the protected mode of computing device 110.

As described above, transferor 107 (as well as transferee 109) may be various parties including individuals and entities (e.g., retailers, couriers, manufacturers). For example, transferor 107 may be an individual selling computing device 110 to transferee 109. As another example, transferor 107 may be an entity, such as a manufacturer or retailer selling computing device 110 to transferee 109. Transferor 107 may provide verification information known to transferor 107 to computing device 110, which computing device

110 may store as one or more of signal parameters 116. For example, transferor 107 may know the transferee's address, phone number, email address, etc. based on an order placed by transferee 109 with transferor 107 for the purchase of computing device 110, such as through an online marketplace hosted by one or more of computing systems 104 used or provided by transferor 107.

In some examples, transferor 107 may integrate activation of the protected mode of computing device 110 into one or more processes (e.g., sales, shipping processes). For example, transferor 107, such as through a computing system of computing systems 104 may obtain a unique identifier for computing device 110 (e.g., scan a barcode or other identifier of computing device 110). The computing system 104 may identify computing device 110 from a plurality of other computing devices (e.g., other computing devices sold by transferor 107) as the computing device to be transferred to transferee 109 using the unique identifier. Once identified from the plurality of other computing devices, computing system 104 may activate the protected mode of computing device 110 prior to transferring (e.g., shipping) computing device 110 to transferee 109. The computing system may send verification information known to transferor 107 (e.g., the address, phone number, email address, etc. of transferee 109) to computing device 110 for storage as one or more of signal parameters, such as prior to activating the protected mode of computing device 110.

In some examples, anti-theft module 114 may erase user information (e.g., the data belonging to transferor 107), such as to prepare computing device 110 for transfer to transferee 109. For instance, anti-theft module 114 may erase photos, videos, music, notes, messages, accounts, settings, telemetry (e.g., location, usage, logging information) collected by computing device 110, and/or other user generated content from computing device 110 that belong to transferor 107 or that transferor 107 wishes to remain private. Anti-theft module 114 may prompt transferor 107 for an indication (e.g., confirmation) that transferor 107 desires such user information to be erased. In response to such an indication from transferor 107, anti-theft module 114 may erase the user information from computing device 110. Anti-theft module 114 may prompt transferor 107 and erase the user information prior to activating the protected mode of computing device 110. For example, anti-theft module 114 may prompt transferor 107 prior to, during, or after activating the protected mode. As described above, anti-theft module 114 may refrain from erasing one or more of signal parameters 116 as part of erasing user information.

By disabling computing device 110 through activation of the protected mode, anti-theft module 114 of computing device 110 deters theft by making computing device 110 unusable while also allowing protected mode information to be collected by computing device 110 for the purpose of tracking computing device 110. In this manner, the device-based anti-theft and recovery techniques described herein increase the chance of recovering computing device 110 if computing device 110 is lost or stolen during transfer between transferor 107 and transferee 109.

As can be seen, the device-based anti-theft and recovery techniques described herein may be device-based in that anti-theft module 114 may store and process signal parameters 116 on device. In this manner, anti-theft module 114 may verify whether computing device 110 is in the possession of transferee 109 on device. By processing signal parameters 116 on device, anti-theft module 114 may reduce consumption of computing resources. For example, anti-theft module 114 reduces consumption of network bandwidth in that anti-theft module 114 may determine signals and process such signals relative to signal parameters 116 at computing device 110 (e.g., on device) without off device communication. Anti-theft module 114 also reduces or consumption of resources (e.g., compute, bandwidth) at computing systems 104 by performing the device-based anti-theft and recovery techniques.

As described above, the device-based anti-theft and recovery techniques described herein are also compatible with a variety of different computing systems 104. Such compatibility allows resource (e.g., compute, storage, bandwidth) consumption to be spread across various computing systems 104, which may be provided by independent parties. The resource consumption at individual computing systems 104 may therefore be reduced, thereby improving the performance of computing systems 104.

With respect to computing device 110, the device-based anti-theft and recovery techniques reduce or eliminate resource consumption by unauthorized parties that have intercepted computing device 110 in transit between transferor 107 and transferee 109. For example, rather than consuming bandwidth to verify the unauthorized party computing device 110 may perform the device-based anti-theft and recovery techniques described herein. As another example, rather than allowing the unauthorized party to consume compute, memory, power, and/or bandwidth resources of computing device 110, the device-based anti-theft and recovery techniques may prevent the unauthorized party from access to these resources. By preventing such access, computing device 110 may be more likely to be delivered to transferee 109 without unauthorized consumption of these resources of computing device 110.

The device-based anti-theft and recovery techniques described herein utilize signal parameters 116 to verify whether computing device 110 is in the possession of transferee 109. The processing (e.g., comparison) of signals relative to signal parameters 116 may be resource efficient and therefore have a low latency for the task of verifying the identity of a party that is in possession of computing device 110.

Figure 2:
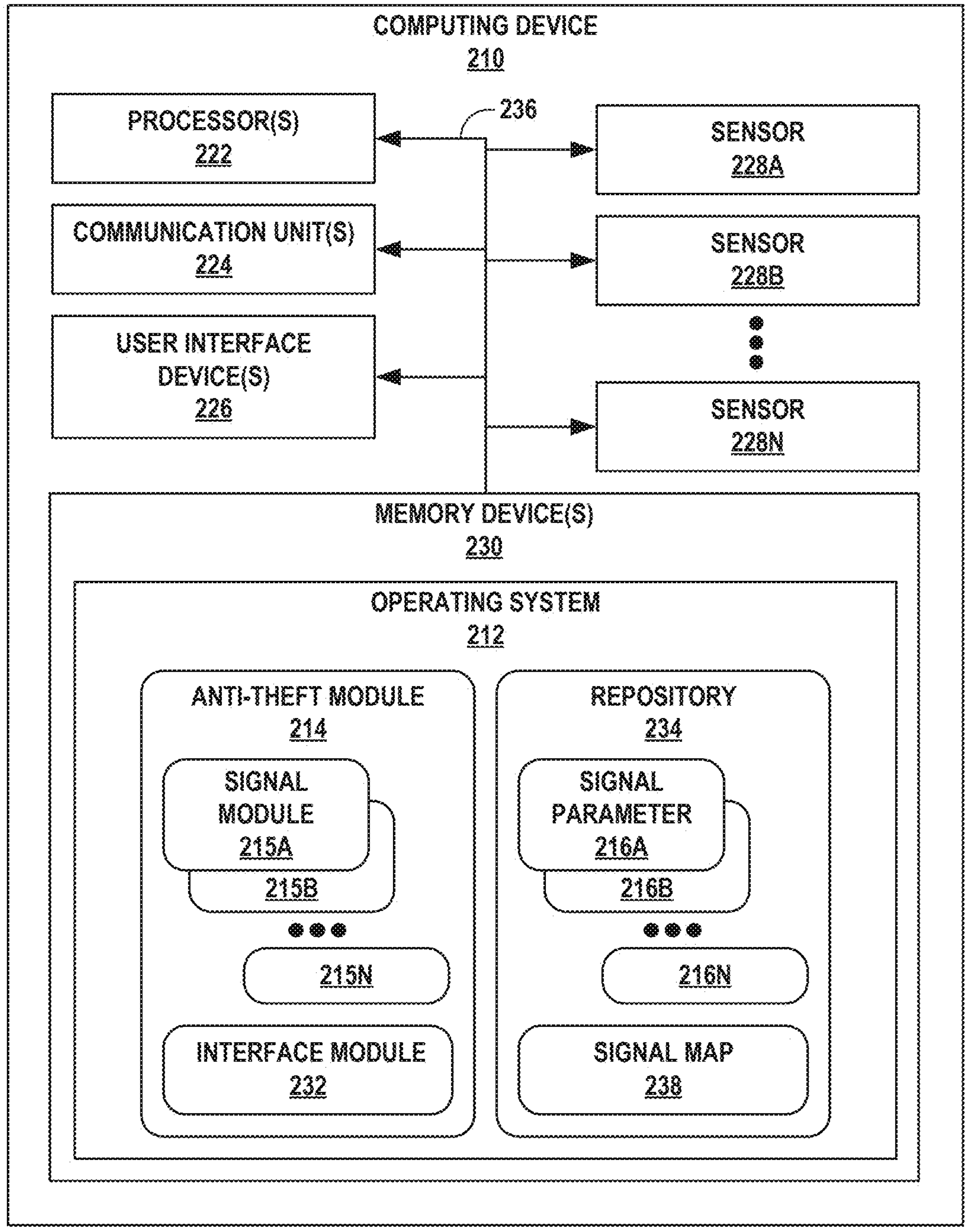
FIG. 2 is a block diagram illustrating an example computing device, in accordance with one or more aspects of the present disclosure.

FIG. 2 is a block diagram illustrating an example computing device, in accordance with one or more aspects of the present disclosure. As can be seen, computing device 210 may include one or more processors 222, one or more communication units 224, one or more user interface devices 226, one or more sensors 228A-228N (collectively, "sensors 228"), and one or more memory devices 230, or various subsets thereof. Aspects of FIG. 2 may be described in the context of FIG. 1. For example, computing device 210, signal modules 215A-215N (collectively, "signal modules 215"), and signal parameters 216A-216B (collectively, "signal parameters 216") may respectively be examples of computing device 110, signal modules 115, and signal parameters 116 of FIG. 1. One or more memory devices 230 of computing device 210 may include operating system 212, anti-theft module 214, and repository 234. Operating system 212 and anti-theft module 214 may respectively be examples of operating system 112 and task anti-theft module 114 of FIG. 1. FIG. 2 illustrates a particular example of computing device 210, and many other examples of computing device 210 may be used in other instances and may include a subset of the components included in example computing device 210 or may include additional components not shown in FIG. 2.

One or more communication channels 236 may interconnect each of the components 222, 224, 226, 228, 230 for inter-component communications (physically, communicatively, and/or operatively). In some examples, one or more communication channels 236 may include a system bus, a network connection, an inter-process communication data structure, or any other method for communicating data.

One or more user interface devices 226 of computing device 210 may represent hardware that functions as an input and/or output device for computing device 210. For example, user interface device 226 may include a display component, which may be a screen at which information is displayed by user interface device 226 and a presence-sensitive input device that may detect an object at and/or near the display component. In some examples, user interface device 226 may include one or more input devices that receive input. Examples of input include tactile, audio, and video input. Input devices of user interface device 226, in one example, includes a presence-sensitive display, touch-sensitive screen, mouse, keyboard, voice responsive system, video camera, microphone or any other type of device for detecting input from a human or machine. User interface device 226 may include one or more output devices that generate output. Examples of output include tactile, audio, and video output. Output devices user interface device 226, in one example, includes a presence-sensitive display, sound card, video graphics adapter card, speaker, liquid crystal display (LCD), organic light-emitting diode (OLED) display, a light field display, haptic motors, linear actuating devices, or any other type of device for generating output to a human or machine.

One or more communication units 224 of computing device 210 may communicate with external devices by transmitting and/or receiving communication signals, such as via one or more wireless networks or wireless connections. Examples of one or more communication units 224 include a network interface card, an optical transceiver, a radio frequency transceiver, a global positioning system (GPS) receiver, or any other type of device that can wirelessly send and/or receive information. Other examples of one or more communication units 224 may include short wave radios, cellular data radios, wireless network radios (e.g., WI-FI radio, BLUETOOTH radio), as well as universal serial bus (USB) controllers. Computing device 110 may include one or more communication units 224 that use wired connections, such as network interface cards (e.g., Ethernet cards), fiberoptic transceivers, or any other type of device that can send and/or receive information over a wired connection.

One or more processors 222 may implement functionality and/or execute instructions within computing device 210. For example, one or more processors 222 on computing device 210 may receive and execute instructions stored by one or more memory devices 230 that execute the functionality of operating system 212, anti-theft module 214, signal modules 215, repository 234, and interface module 232 or various subsets thereof. The instructions executed by one or more processors 222 may cause computing device 210 to store information within one or more memory devices 230 during program execution. Examples of one or more processors 222 include general purpose processors (e.g., central processing units (CPUs), accelerators (e.g., graphics processing units (GPUs), neural processing units (NPUs), application processors, display controllers, sensor hubs, and any other hardware configured to function as a processing unit. One or more processors 222 may execute instructions of operating system 212, anti-theft module 214, signal modules 215, and repository 234, and interface module 236, or various subsets thereof to perform actions or functions. That is, one or more of operating system 212, anti-theft module 214, signal modules 215, repository 234, or interface module 236 may be operable by one or more processors 222 to perform various actions or functions of computing device 210.

One or more memory devices 230 within computing device 210 may store information for processing during operation of computing device 210. That is, computing device 210 may store data accessed by operating system 212, anti-theft module 214, signal modules 215, repository 234, and interface module 236, or various subsets thereof during execution at computing device 210, including signal parameters 216, signal map 238, and other data.

In some examples, memory devices 230 may be temporary memory, meaning that a primary purpose of memory device 230 is not long-term storage. One or more memory devices 230 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

One or more memory devices 230, in some examples, also include one or more computer-readable storage media. One or more memory devices 230 may be configured to store larger amounts of information than volatile memory. One or more memory devices 230 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. One or more memory devices 230 may store program instructions and/or information (e.g., data) associated with operating system 212 anti-theft module 214, signal modules 215, repository 234, and interface module 236, or various subsets thereof.

Computing device 210 may use one or more sensors 228 to determine various signals. For example, computing device 210 may use one or more sensors 228 to capture a variety of sensor data. For instance, sensors 228 may capture sensor data about an environment related to computing device 210 (e.g., the location of computing device 210, network(s) and/or device(s) connected to computing device 210). Examples of sensors 228 include imaging sensors (e.g., cameras), proximity sensors (e.g., BLUETOOTH and/or UWB radios), presence sensors (e.g., infrared sensor), location sensors (e.g., GNSS receivers), sound sensors (e.g., microphones), or other sensing devices suitable to collect sensor or other data for use as input as one or more signals to one or more of signal modules 215. As such, in some examples, sensors 228 may include one or more of communication units 224. For example, a communication unit of communication units 224 may capture network information including network names, network address, certification information, and the like that the communication unit may send to one or more of signal modules 215 as one or more signals.

Anti-theft module 214 may execute at one or more processors 222 to perform anti-theft tasks, such as signal processing through signal modules 215, managing (e.g., creating, storing, updating, deleting) signal parameters 216, activation and deactivation of a protected mode of computing device 110, or the like. Anti-theft module 214 may include signal modules 215 which anti-theft module 214 may invoke to perform signal processing using one or more signals and/or one or more signal parameters 216.

Anti-theft module 214 may include interface module 232. Interface module 232 may generate one or more user interfaces that present output and receive input such as through user interface devices 226. For example, interface module 232 may generate a user interface with controls (e.g., buttons, toggles, text or other input boxes) that prompt a user for input and/or input from a user, such as transferor 107 of FIG. 1. For instance, a user interface generated by interface module 232 may receive verification information (e.g., location coordinates, network names/addresses, device identifiers, secret codes, etc.) from transferor 107 that anti-theft module 214 may store as one or more of signal parameters 216. As another example, a user interface generated by interface module 232 may receive input from transferor 107 that instructs anti-theft module 214 to activate the protected mode of computing device 110, such as when transferor 107 is preparing to ship computing device 110 to transferee 109.

Repository 234 may represent a data store (e.g., database, file, directory) that utilizes one or more structured data formats (e.g., software query language (SQL) databases) or unstructured data formats (e.g., NoSQL databases) to store data. Repository 234 may store, such as in one or more records of repository 234, signal parameters 216. Anti-theft module 214 may receive verification information, such as from transferor 107 and/or transferee 109 of FIG. 1, and cause repository 234 to store such verification information as one or more of signal parameters 216. In some examples, anti-theft module 214 may transform verification information into a signal parameter of signal parameters 216 prior to storage by repository 234. For example, anti-theft module 214 may convert the verification information to particular units of measure, data types, or the like such that the resulting signal parameters 216 may be meaningfully processed relative to one or more signals (e.g., compared to one or more signals) by signal modules 215.

Each of signal modules 215 may process a particular type of signal and/or signal parameter of signal parameters 216. For example, signal parameter 216A may represent location information (e.g., GNSS coordinates), signal parameter 216B may represent a network name (e.g., SSID), and signal parameter 216N may represent a time window (e.g., 48 hours). Repository 234 may store a signal map 238 including a record of which of signal modules 215 should be used to process each of signal parameters 216, such as shown in Table 1 below. As can be seen, signal map 238, in this example, indicates signal module 215A processes signal parameter 216A, signal module 215B processes signal parameter 216B, and signal module 215N processes signal parameter 216N.

TABLE 1

| Signal Parameter | Signal module | Signal Category | Signal Type |
|---|---|---|---|
| 216A | 215A | Location-based | GNSS Coordinates |
| 216B | 215B | Network-based | SSID |
| 216N | 215N | Time-based | Current Time |

In some examples, repository 234 may store, in signal map 238, an indication of the signal category, signal type, or both corresponding to each of signal parameters 216A and/or each of signal modules 215, such as shown in the example of Table 1 above. In this example for instance, signal map 238 indicates signal parameter 216A represents a location-based signal that constitutes GNSS coordinates and signal module 215A processes such signals. Continuing this example, signal map 238 indicates that signal parameter 216B represents a network-based signal that constitutes an SSID, which signal module 215B processes, as well as that signal parameter 216N represents a time-based signal that constitutes a current time, which signal module 215N processes. Anti-theft module 214 may read signal map 238 to select a signal module of signal modules 215 to invoke to process a particular signal. For example, anti-theft module 214 may determine a type for the particular signal and query signal map 238, with the determined type, to determine which of signal modules 215 and/or which of signal parameters 216 should be used to process the particular signal. For instance, anti-theft module 214 may determine the particular signal includes GNSS coordinates and read signal map 238 and invoke signal module 215A with signal parameter 216A and the particular signal as input. Signal module 215A may process (e.g., compare) the particular signal to signal parameter 216A as a result of such invocation.

Anti-theft module 214 may determine a type for a signal in various ways. For example, anti-theft module 214 may determine a type for a signal based on the source from which the signal is determined. For example, sensor 228A may represent a GNSS sensor (e.g., GNSS receiver), sensor 228B may represent a network interface (e.g., WI-FI radio), and sensor 228N may represent a timing device (e.g., clock). In this example, anti-theft module 214 may determine that signals including sensor data from sensor 228A correspond to location-based signals (e.g., GNSS coordinates), signals including sensor data from sensor 228B correspond to network-based signals (e.g., SSIDs, IP addresses, attached certificates), and signals including sensor data from sensor 228N correspond to time-based signals (e.g., current time). In some examples, anti-theft module 214 may determine the type for a signal by performing pattern (e.g., regular expression) matching, machine learning (ML) or heuristics based classification techniques, ML or heuristics based recognition techniques, or other suitable techniques on the signal.

Figure 3:
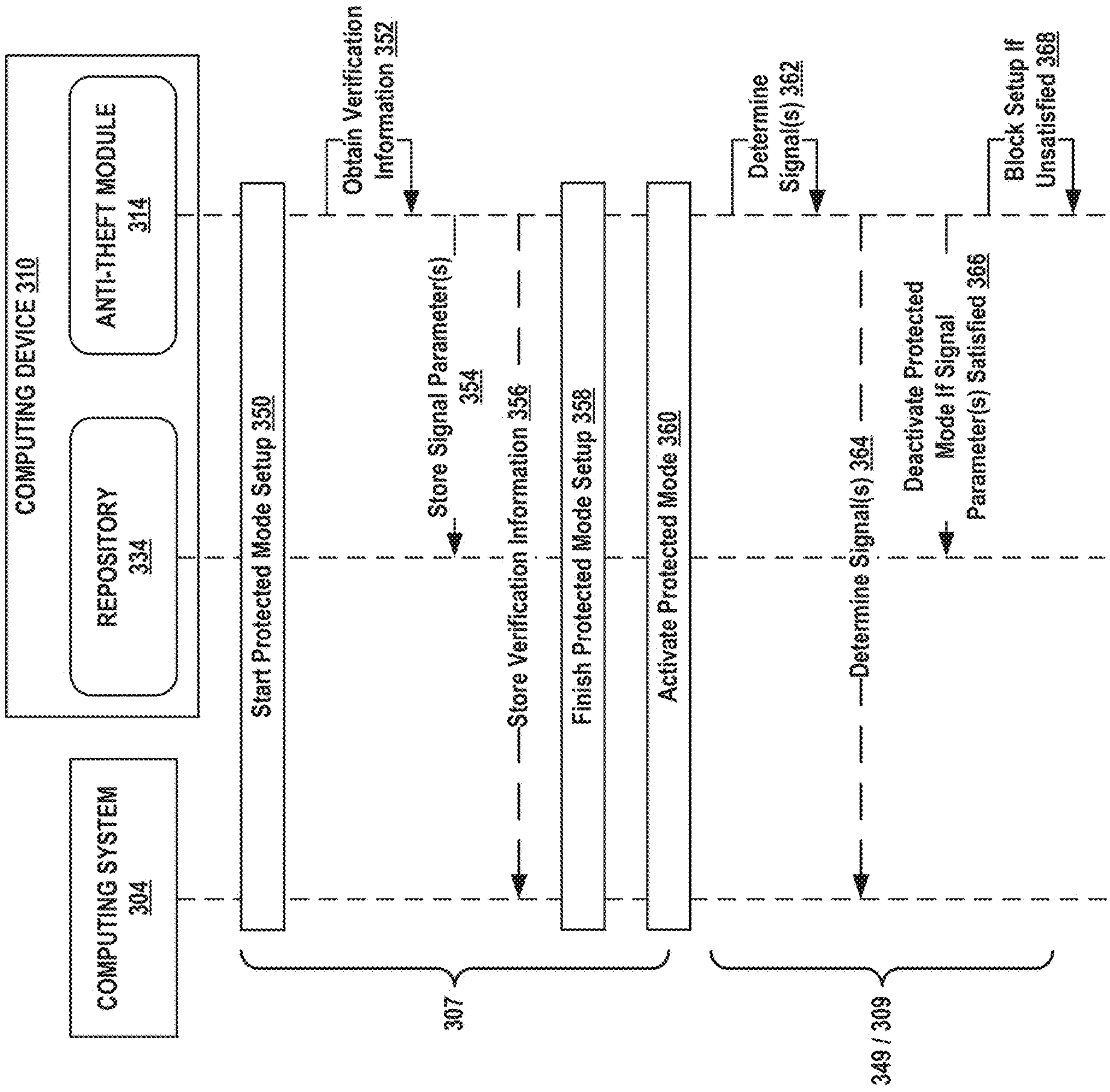
FIG. 3 is a block diagram illustrating a first example of a device-based anti-theft and recovery process, in accordance with one or more aspects of the present disclosure.

FIG. 3 is a block diagram illustrating a first example of a device-based anti-theft and recovery process, in accordance with one or more aspects of the present disclosure. Aspects of FIG. 3 may be described in the context of FIGS. 1-2. For example, computing system 304, computing device 310, and anti-theft module 314 may respectively be examples of computing system 104, computing device 110, and anti-theft module 114 of FIG. 1. Repository 334 may be an example of repository 234 of FIG. 2.

In general, the device-based anti-theft and recovery process of FIG. 3 illustrates an example process including the transfer of computing device 310 between a transferor 307 and a potential transferee 349. Potential transferee 349 may be the same party as transferee 309 (e.g., the intended transferee), if verified by anti-theft module 314. Transferor 307 and transferee 309 may respectively be examples of transferor 107 and transferee 109 of FIG. 1. As will be described in the following, computing device 310, such as through anti-theft module 314, may perform one or more portions of the process in connection with transferor 307 and one or more other portions of the process in connection with potential transferee 349.

As can be seen, transferor 307 may start a setup process (e.g., execute an activation wizard) for activating the protected mode of computing device 110 (350). Such protected mode setup may include obtaining verification information (352). For example, anti-theft module 314 may obtain verification information from transferor 307, which transferor 307 may have previously received from transferee 309. As described above for instance, the verification information may identify a safe location of transferee 309, a safe network of transferee 309, or other information suitable for use by anti-theft module 314 in verifying whether computing device 310 is in the possession of transferee 309. Anti-theft module 314 may store the verification information to repository 234 as one or more signal parameters (354), which may be examples of one or more of signal parameters 216 of FIG. 2.

As shown by the broken line depiction thereof, in some examples, anti-theft module 314 may optionally store the verification information to computing system 104 (356). For example, anti-theft module 314 may store verification information including a secret code to computing system 104. As described above, a computing system, such as computing system 304, may assign the secret code to an account of transferee 309 to allow the secret code to be used to verify that computing device 310 is in the possession of transferee 309, as will also be described below.

After at least one signal parameter is stored to repository 334, anti-theft module 314 may finish the protected mode setup (358). Anti-theft module 314 may activate the protected mode of computing device 310 (360). Anti-theft module 314 may activate the protected mode of computing device 310 automatically after the protected mode setup is complete or may activate the protected mode in response to user input from transferor 307. For example, anti-theft module 114 may activate the protected mode in response to input confirming and/or instructing anti-theft module 114 to activate the protected mode. Anti-theft module 314 may present a user interface, such as through user interface device 226 of FIG. 2, that receives such input, such as through a button or other user interface element thereof. In some examples, anti-theft module 314 may erase user information, such as user generated content from computing device 310 as part of activating the protected mode. For example, anti-theft module 314 may erase all user generated content from memory devices 230 of FIG. 2.

Once the protected mode is activated, transferor 307 may surrender physical control of computing device 310 to transfer computing device 310 to transferee, such as to ship or otherwise physically transfer computing device 310 to transferee 309. Transferor 307 may, for example, ship computing device 310 to transferee 309 in response to receiving payment or an agreement for payment from transferee 309.

Anti-theft module 314 may determine one or more signals to verify whether computing device 310 is in the possession of transferee 309 (362). As can be seen from the example of FIG. 3, anti-theft module 314 may determine one or more signals when computing device 310 is physically received by potential transferee 349 (who may, if verified, also be transferee 309). For example, anti-theft module 314 may determine one or more signals when computing device 310 activated (e.g., powered on, awakened) by potential transferee 349. For instance, anti-theft module 314 may determine the one or more signals when potential transferee 349 provides input through one or more user interface devices, such as one or more of user interface devices 226, that causes computing device 310 to execute a wake function that powers on or awakens computing device 310. Alternatively or in addition, anti-theft module 314 may determine one or more signals independent of such activation, such as by determining the one or more signals periodically (e.g., every hour) and/or in response to various events. Such events may be detected through a sensor of computing device 310. Some examples of events include detecting computing device 310 is at the shipping destination address, detecting motion of computing device 310, detecting light that greater than a luminance threshold at computing device 310, etc. with a location sensor, accelerometer, light sensor, or other sensor of computing device 310).

In some examples, in addition or instead of determining one or more signals at computing device 310, anti-theft module 314 may determine one or more signals through computing system 304 (364). As shown by the broken line depiction thereof, determining one or more signals through computing system 304 may be optional. For example, anti-theft module 314 may determine a signal including a secret code assigned to a user account of potential transferee 349, such as described above. For instance, when potential transferee 349 accesses the user account from computing device 310, anti-theft module 314 may retrieve a secret code, if any, that was previously assigned to the user account. As described above, computing system 304 may receive such secret code in connection with a user account of transferor 307. Computing system 304 may transfer the secret code to a user account of potential transferee 349, which then may be retrieved by anti-theft module 314 when potential transferee 349 accesses their user account from computing device 310.

After determining the one or more signals, anti-theft module 314 may verify whether computing device 310 is in the possession of transferee 309. For example, anti-theft module 314, such as through one or more of signal modules 215 of FIG. 2, may process the one or more signals relative to one or more signal parameters, such as one or more of signal parameters 216 of FIG. 2. As described above, anti-theft module 314, such as through one or more of signal modules 215, may compare the one or more signals to one or more corresponding signal parameters of signal parameters 216. Anti-theft module 314 may verify that computing device 310 is in the possession of transferee 309 (e.g., verify that potential transferee 349 is transferee 309) if one or more of signal parameters 216 are satisfied. Anti-theft module 314 may make such verification if one or more of signal parameters 216 are satisfied, if a threshold weight is satisfied as part of a weighted assessment, or both.

If anti-theft module 314 verifies that computing device 310 is in the possession of transferee 309, anti-theft module 314 may deactivate the protected mode of computing device 310, or permit transferee 309 to deactivate the protected mode of computing device 310 (366). If the protected mode of computing device 310 is deactivated, one or more protected functions of computing device 310 may be executed. As such, computing device 310 may perform a setup process (e.g., setup wizard) for transferee 309 to setup computing device 310 for transferee's use.

If anti-theft module 314 is unable to verify that computing device 310 is in the possession of transferee 309 (e.g., the one or more signal parameters are not satisfied, the threshold weight is not satisfied), anti-theft module 314 is unable to verify that potential transferee 349 is transferee 309. As such, if anti-theft module 314 is unable to verify that computing device 310 is in the possession of transferee 309, anti-theft module 314 may refrain from deactivating the protected mode of computing device 310 and/or prevent potential transferee 349 from deactivating the protected mode of computing device 310 (368).

Figure 4:
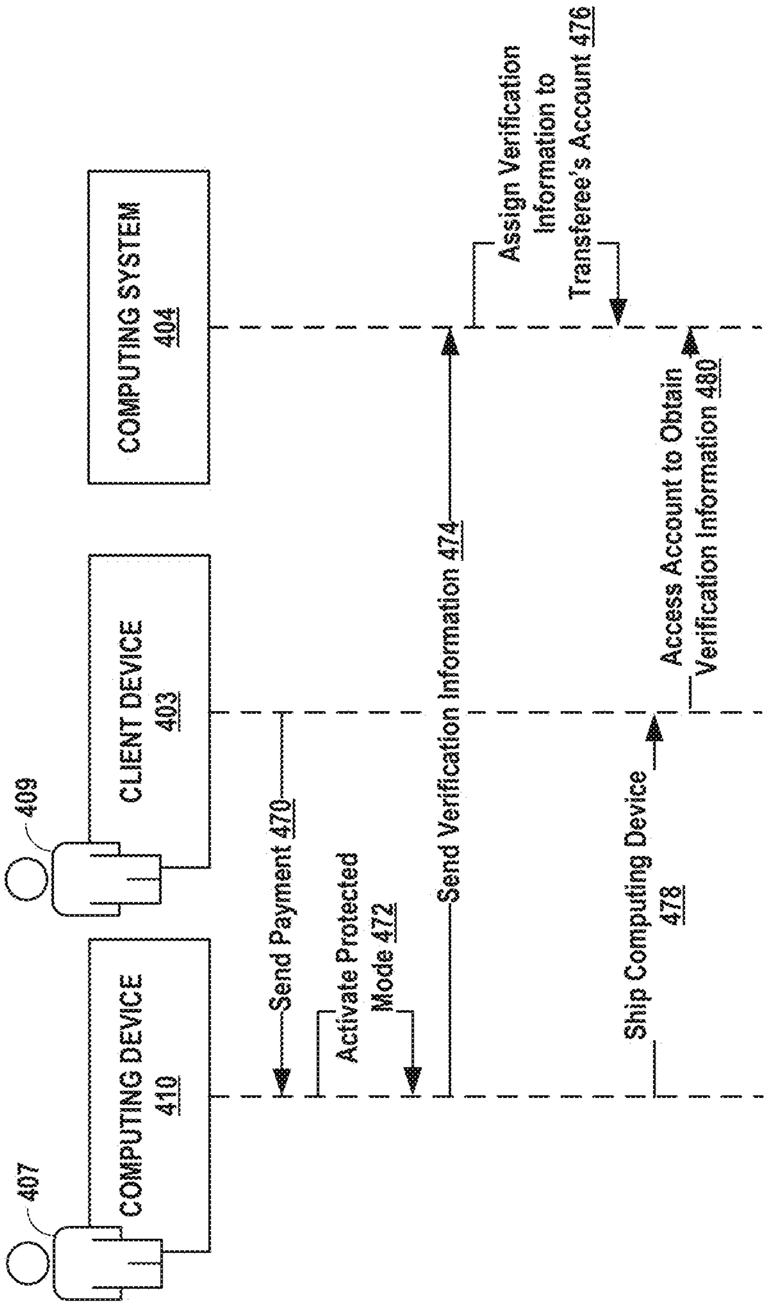
FIG. 4 is a block diagram illustrating a second example of a device-based anti-theft and recovery process, in accordance with one or more aspects of the present disclosure.

FIG. 4 is a block diagram illustrating a second example of a device-based anti-theft and recovery process, in accordance with one or more aspects of the present disclosure. Aspects of FIG. 4 may be described in the context of FIGS. 1-2. For example, computing system 404, computing device 410, and client device 403 may respectively be examples of computing system 104, computing device 110, and client device 103 of FIG. 1. Transferor 407 and transferee 409 may respectively be examples of transferor 107 and transferee 109 of FIG. 1.

In general, the device-based anti-theft and recovery process of FIG. 4 illustrates an example process including the transfer of computing device 410 between transferor 407 and transferee 409, using computing system 404. As can be seen, as part of the transfer of computing device 410, transferee 409 may send payment to transferor 407. For example, client device 403 may send electronic payment to transferor 407 as directed by transferee 409 (470). Transferor 407 may activate the protected mode of computing device 410 to prepare computing device 410 for shipment to transferee 409, such as in response to receiving the payment from transferee 409. For example, anti-theft module 214 of computing device 410 may activate the protected mode of computing device 410 (472), such as in response to user input corresponding to such activation that is received by computing device 410 from transferor 407. Anti-theft module 214 may receive verification information (e.g., a secret code) from transferor 407, such as through one or more user interface devices 226 of FIG. 2. Anti-theft module 214 may store the verification information to computing device 410 as a signal parameter, such a signal parameter of signal parameters 216 of FIG. 2.

Transferor 407 may send the verification information, such as a secret code, to computing system 404. For example, as described above, computing device 410 may receive the verification information from transferor 407, such as through one or more user interface devices 226. Computing device 410 may send the verification information to computing system 404 (474). Computing device 410 may send the verification information using a user account of transferor 407 at computing system 404. Computing system 404 may assign the verification information to a user account of transferee 409 at computing system 404 (476). Though described in connection with computing device 410, in some circumstances, rather than using computing device 410 to send the verification information to computing system 404, transferor 407 may use another device to send the verification information to computing system 404.

Transferor 407 may ship computing device 410 to transferee 409 (478). Transferee 409, such as through client device 403, may obtain the verification information from computing system 404 (480). For example, transferee 409 may access (e.g., sign in to), from a device of transferee 409 (e.g., client device 403) the user account of transferee 409 at computing system 404 to retrieve the verification information from computing system 404. Though not shown in FIG. 4, computing device 410 may receive a signal including the verification information (e.g., the secret code), which anti-theft module 214 may process to verify that computing device 410 is in the possession of transferee 409. For example, anti-theft module 214 may receive input from transferee 409 that includes the verification information. As another example, if transferee 409 accessed their user account with computing device 410, anti-theft module 214 may automatically retrieve the verification information from computing system 404. In either case, anti-theft module 214 may use the received or retrieved verification information as a signal for verification purposes. For example, anti-theft module 214 may compare the secret code from the signal to the secret code from the signal parameter described above. If the secret code from the signal satisfies the signal parameter, anti-theft module 214 may verify that computing device 410 is in the possession of transferee 409, and deactivate or allow deactivation of the protected mode of computing device 410. After the protected mode of computing device 410 is deactivated, computing device 410 may be fully functional and may perform setup, factory reset, or other functions as desired by transferee 409.

Figure 5:
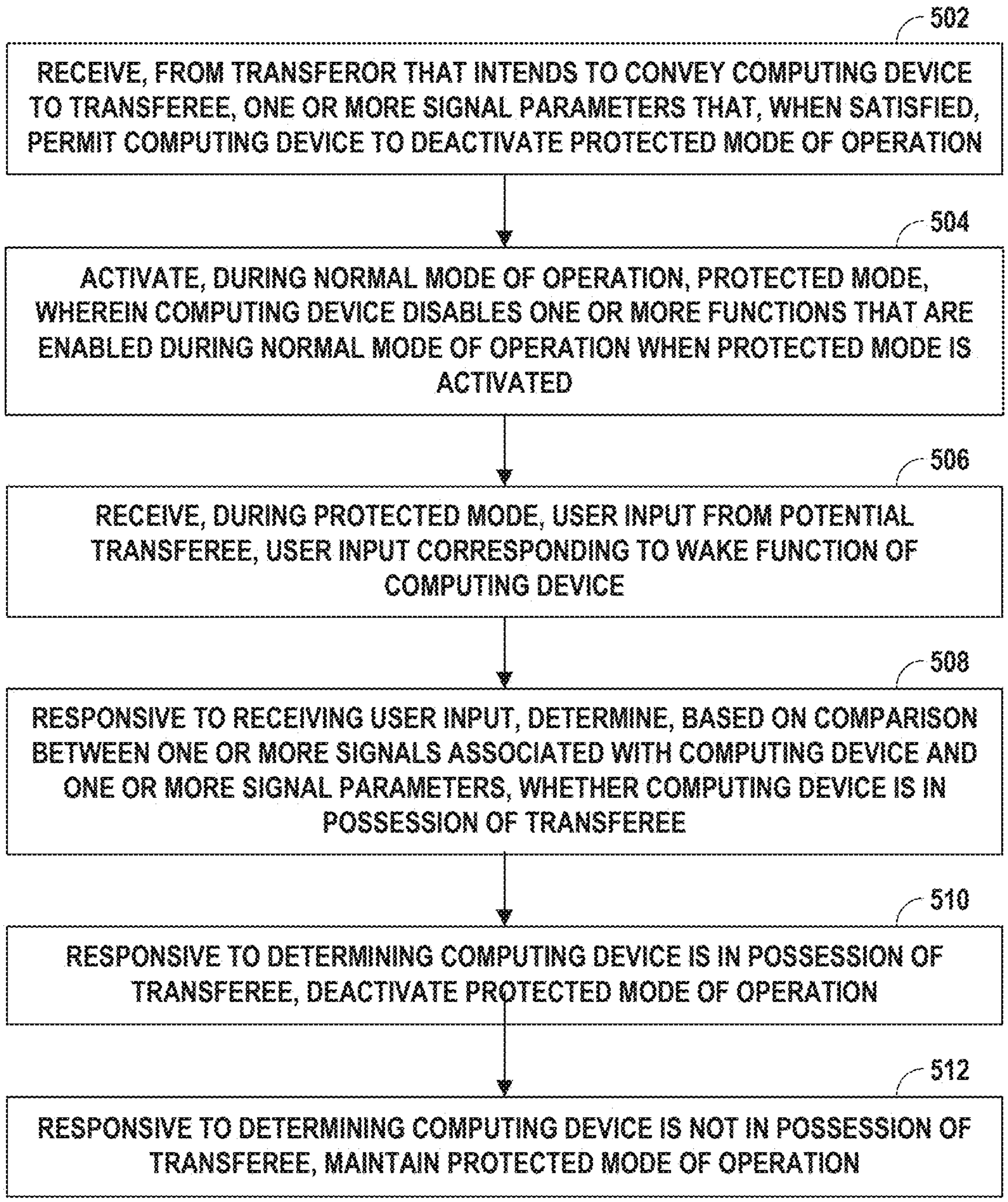
FIG. 5 is a flowchart of an example device-based anti-theft and recovery process, in accordance with one or more aspects of the present disclosure.

FIG. 5 is a flowchart of an example device-based anti-theft and recovery process, in accordance with one or more aspects of the present disclosure. Aspects of FIG. 5 may be described in the context of FIGS. 1-3.

Computing device 110 may receive, from a transferor 107 that intends to convey computing device 110 to a transferee 109, one or more signal parameters 116 that, if satisfied, permit computing device 110 to deactivate a protected mode of operation (502).

Computing device 110 may activate, during a normal mode of operation, the protected mode, wherein computing device 110 disables one or more functions that are enabled during the normal mode of operation while the protected mode is activated (504). Computing device 110 may disable functions of computing device 110 other than anti-theft and recovery functions while the protected mode is activated.

Computing device 110 may receive, during a normal mode of operation, a user input from transferor 107 that corresponds to activation of the protected mode. Computing device 110 may activate the protected mode in response to receiving the user input from transferor 107. For example, the user input may be a command or confirmation to activate the protected mode. In some examples, to activate the protected mode, computing device 110 may erase user generated content stored on the computing device.

Computing device 110 may receive, during the protected mode, a user input from a potential transferee 349, the user input corresponding to a wake function of computing device 110 (506). Computing device 110 may, responsive to receiving the user input, determine, based on a comparison between one or more signals associated with computing device 110 and one or more signal parameters 116, whether computing device 110 is in possession of transferee 109 (508). To determine whether computing device 110 is in possession of transferee 109 computing device 110, such as through one or more signal modules 115, may determine whether the one or more signals satisfy one or more signal parameters 116.

The one or more signals may be one or more location-based signals, one or more network-based signals, one or more account-based signals, one or more time-based signals, one or more biometric signals, and one or more device-specific signals, or various subsets thereof. Computing device 110 may determine, with one or more sensors 228, the one or more signals. One or more sensors 228 may represent one or more location sensors, one or more network interface devices, one or more storage devices, one or more timekeeping devices, and one or more biometric sensors, or various subsets thereof.

Computing device 110 may, responsive to determining computing device 110 is in the possession of transferee 109, deactivate the protected mode of operation (510).

Computing device 110 may, responsive to determining computing device 110 is not in the possession of the transferee 109, maintain the protected mode of operation (512). Computing device 110 may, in some examples, continue to attempt to verify whether computing device 110 is in the possession of transferee 109. For example, in response to determining computing device 110 is not in the possession of transferee 109, computing device 110 may output, to potential transferee 349, a prompt to input verification information, receive, from potential transferee 349, the verification information, and verify potential transferee 349 as transferee 109 based on a comparison between the verification information to stored verification information. As another example, in response to determining computing device 110 is not in the possession of transferee 109, computing device 110 may determine a location of computing device 110, such as through one or more sensors 228, and send, to transferor 107, an indication of the location of computing device 110.

This disclosure includes the following examples.

Example 1: A method includes receiving, by a computing device and from a transferor that intends to convey the computing device to a transferee, one or more signal parameters that, if satisfied, permit the computing device to deactivate a protected mode of operation; activating, by the computing device and during a normal mode of operation, the protected mode, wherein the computing device disables one or more functions that are enabled during the normal mode of operation while the protected mode is activated; receiving, by the computing device and during the protected mode, a user input from a potential transferee, the user input corresponding to a wake function of the computing device; responsive to receiving the user input, determining, by the computing device and based on a comparison between one or more signals associated with the computing device and the one or more signal parameters, whether the computing device is in possession of the transferee; responsive to determining the computing device is in the possession of the transferee, deactivating, by the computing device, the protected mode of operation; and responsive to determining the computing device is not in the possession of the transferee, maintaining, by the computing device, the protected mode of operation.

Example 2: The method of example 1, wherein the one or more signals are selected from the group consisting of one or more location-based signals, one or more network-based signals, one or more account-based signals, one or more time-based signals, one or more biometric signals, and one or more device-specific signals.

Example 3: The method of example 1, further comprising determining, by the computing device and with one or more sensors, the one or more signals, wherein the one or more sensors are selected from the group consisting of one or more location sensors, one or more network interface devices, one or more storage devices, one or more timekeeping devices, and one or more biometric sensors.

Example 4: The method of example 1, wherein determining whether the computing device is in possession of the transferee comprises determining whether the one or more signals satisfy the one or more signal parameters.

Example 5: The method of example 1, further includes outputting, by the computing device and to the potential transferee, a prompt to input verification information; receiving, by the computing device and from the potential transferee, the verification information; and verifying, by the computing device, the potential transferee as the transferee based on a comparison between the verification information to stored verification information.

Example 6: The method of example 1, further includes sending, by the computing device and to the transferor, a request to confirm that the computing device is in the possession of the transferee; receiving, by the computing device, an indication of a response to the request; and verifying, by the computing device and based on the indication of the response to the request, the potential transferee as the transferee.

Example 7: The method of example 1, further includes determining, by the computing device, a location of the computing device; and sending, by the computing device and to the transferor, an indication of the location of the computing device.

Example 8: The method of example 1, further includes receiving, by the computing device and during a normal mode of operation, a user input from the transferor, the user input from the transferor corresponding to activation of the protected mode, wherein activating the protected mode is in response to receiving the user input from the transferor.

Example 9: The method of example 1, wherein the computing device disables functions of the computing device other than anti-theft and recovery functions while the protected mode is activated.

Example 10: The method of example 1, wherein activating the protected mode comprises erasing, by the computing device, user generated content stored on the computing device.

Example 11: A computing device includes a memory that stores instructions; one or more sensors that receive one or more signals associated with the computing device; and one or more processors that execute the instructions to receive, from a transferor that intends to convey the computing device to a transferee, one or more signal parameters that, if satisfied, permit the computing device to deactivate a protected mode of operation; activate, during a normal mode of operation, the protected mode, wherein the computing device disables one or more functions that are enabled during the normal mode of operation while the protected mode is activated; receive, during the protected mode, a user input from a potential transferee, the user input corresponding to a wake function of the computing device; responsive to receiving the user input, determine, based on a comparison between the one or more signals and the one or more signal parameters, whether the computing device is in possession of the transferee; responsive to determining the computing device is in the possession of the transferee, deactivate the protected mode of operation; and responsive to determining the computing device is not in the possession of the transferee, maintain the protected mode of operation.

Example 12: The computing device of example 11, wherein the one or more signals are selected from the group consisting of one or more location-based signals, one or more network-based signals, one or more account-based signals, one or more time-based signals, one or more biometric signals, and one or more device-specific signals.

Example 13: The computing device of example 11, wherein the one or more processors execute the instructions to determine, with one or more sensors, the one or more signals, wherein the one or more sensors are selected from the group consisting of one or more location sensors, one or more network interface devices, one or more storage devices, one or more timekeeping devices, and one or more biometric sensors.

Example 14: The computing device of example 11, to determine whether the computing device is in possession of the transferee the one or more processors execute the instructions to determine whether the one or more signals satisfy the one or more signal parameters.

Example 15: The computing device of example 11, wherein the one or more processors execute the instructions to, in response to determining the computing device is not in the possession of the transferee: output, to the potential transferee, a prompt to input verification information; receive, from the potential transferee, the verification information; and verify the potential transferee as the transferee based on a comparison between the verification information to stored verification information.

Example 16: The computing device of example 11, wherein the one or more processors execute the instructions to, in response to determining the computing device is not in the possession of the transferee: send, to the transferor, a request to confirm that the computing device is in the possession of the transferee; receive an indication of a response to the request; and verify, based on the indication of the response to the request, the potential transferee as the transferee.

Example 17: The computing device of example 11, wherein the one or more processors execute the instructions to, in response to determining the computing device is not in the possession of the transferee: determine a location of the computing device; and send, to the transferor, an indication of the location of the computing device.

Example 18: The computing device of example 11, wherein the one or more processors execute the instructions to: receive, during a normal mode of operation, a user input from the transferor, the user input from the transferor corresponding to activation of the protected mode, wherein activating the protected mode is in response to receiving the user input from the transferor.

Example 19: The computing device of example 11, wherein the computing device disables functions of the computing device other than anti-theft and recovery functions while the protected mode is activated.

Example 20: The computing device of example 11, wherein to activate the protected mode the one or more processors execute the instructions to erase user generated content stored on the computing device.

Example 21: Non-transitory computer-readable storage media includes instructions, that when executed by one or more processors of a computing device, cause the one or more processors to receive, from a transferor that intends to convey the computing device to a transferee, one or more signal parameters that, if satisfied, permit the computing device to deactivate a protected mode of operation; activate, during a normal mode of operation, the protected mode, wherein the computing device disables one or more functions that are enabled during the normal mode of operation while the protected mode is activated; receive, during the protected mode, a user input from a potential transferee, the user input corresponding to a wake function of the computing device; responsive to receiving the user input, determine, based on a comparison between one or more signals associated with the computing device and the one or more signal parameters, whether the computing device is in possession of the transferee; responsive to determining the computing device is in the possession of the transferee, deactivate the protected mode of operation; and responsive to determining the computing device is not in the possession of the transferee, maintain the protected mode of operation.

Example 22: The non-transitory computer-readable storage media of example 21, wherein the one or more signals are selected from the group consisting of one or more location-based signals, one or more network-based signals, one or more account-based signals, one or more time-based signals, one or more biometric signals, and one or more device-specific signals.

Example 23: The non-transitory computer-readable storage media of example 21, wherein the instructions, when executed by one or more processors, cause the one or more processors to determine, with one or more sensors, the one or more signals, wherein the one or more sensors are selected from the group consisting of one or more location sensors, one or more network interface devices, one or more storage devices, one or more timekeeping devices, and one or more biometric sensors.

Example 24: The non-transitory computer-readable storage media of example 21, to determine whether the computing device is in possession of the transferee the instructions, when executed by one or more processors, cause the one or more processors to determine whether the one or more signals satisfy the one or more signal parameters.

Example 25: The non-transitory computer-readable storage media of example 21, wherein the instructions, when executed by one or more processors, cause the one or more processors to, in response to determining the computing device is not in the possession of the transferee: output, to the potential transferee, a prompt to input verification information; receive, from the potential transferee, the verification information; and verify the potential transferee as the transferee based on a comparison between the verification information to stored verification information.

Example 26: The non-transitory computer-readable storage media of example 21, wherein the instructions, when executed by one or more processors, cause the one or more processors to, in response to determining the computing device is not in the possession of the transferee: send, to the transferor, a request to confirm that the computing device is in the possession of the transferee; receive an indication of a response to the request; and verify, based on the indication of the response to the request, the potential transferee as the transferee.

Example 27: The non-transitory computer-readable storage media of example 21, wherein the instructions, when executed by one or more processors, cause the one or more processors to, in response to determining the computing device is not in the possession of the transferee: determine a location of the computing device; and send, to the transferor, an indication of the location of the computing device.

Example 28: The non-transitory computer-readable storage media of example 21, wherein the instructions, when executed by one or more processors, cause the one or more processors to: receive, during a normal mode of operation, a user input from the transferor, the user input from the transferor corresponding to activation of the protected mode, wherein activating the protected mode is in response to receiving the user input from the transferor.

Example 29: The non-transitory computer-readable storage media of example 21, wherein the computing device disables functions of the computing device other than anti-theft and recovery functions while the protected mode is activated.

Example 30: The non-transitory computer-readable storage media of example 21, wherein to activate the protected mode the instructions, when executed by one or more processors, cause the one or more processors to erase user generated content stored on the computing device.

Example 31: A computing system including means for performing each step of any combination of the methods of claims 1-10.

Example 32: A computer-program product that includes instructions that cause one or more processors to perform any combination of the methods of examples 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), EEPROM, compact disc read-only memory (CD-ROM) or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

Instructions may be executed by one or more processors, such as one or more digital signal modules (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structures suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various embodiments have been described. These and other embodiments are within the scope of the following claims.

What is claimed is:

1. A method comprising:

receiving, by a computing device and from a transferor that intends to convey the computing device to a transferee, one or more signal parameters that, if satisfied, permit the computing device to deactivate a protected mode of operation, the signal parameters associated with the transferee and specifying one or more of: a geographic location, a network identifier, a network address, a network profile, a device identifier, a threshold distance, a time window, or biometric information;

activating, by the computing device and during a normal mode of operation, the protected mode, wherein the computing device disables one or more functions that are enabled during the normal mode of operation while the protected mode is activated;

receiving, by the computing device and during the protected mode, a user input from a potential transferee, the user input corresponding to a wake function of the computing device;

responsive to receiving the user input, determining, by the computing device and based on a comparison between one or more signals detected by the computing device and the one or more signal parameters, whether the computing device is in possession of the transferee;

responsive to determining the computing device is in the possession of the transferee, deactivating, by the computing device, the protected mode of operation; and responsive to determining the computing device is not in the possession of the transferee, maintaining, by the computing device, the protected mode of operation.

2. The method of claim 1, wherein the one or more signals are selected from the group consisting of one or more location-based signals, one or more network-based signals, one or more account-based signals, one or more time-based signals, one or more biometric signals, and one or more device-specific signals.

3. The method of claim 1, further comprising determining, by the computing device and with one or more sensors, the one or more signals, wherein the one or more sensors are selected from the group consisting of one or more location sensors, one or more network interface devices, one or more storage devices, one or more timekeeping devices, and one or more biometric sensors.

4. The method of claim 1, wherein determining whether the computing device is in possession of the transferee comprises determining whether the one or more signals satisfy the one or more signal parameters.

5. The method of claim 1, further comprising, in response to determining the computing device is not in the possession of the transferee:

outputting, by the computing device and to the potential transferee, a prompt to input verification information;

receiving, by the computing device and from the potential transferee, the verification information; and verifying, by the computing device, the potential transferee as the transferee based on a comparison between the verification information to stored verification information.

6. The method of claim 1, further comprising, in response to determining the computing device is not in the possession of the transferee:

sending, by the computing device and to the transferor, a request to confirm that the computing device is in the possession of the transferee;

receiving, by the computing device, an indication of a response to the request; and verifying, by the computing device and based on the indication of the response to the request, the potential transferee as the transferee.

7. The method of claim 1, further comprising, in response to determining the computing device is not in the possession of the transferee:

determining, by the computing device, a location of the computing device; and sending, by the computing device and to the transferor, an indication of the location of the computing device.

8. The method of claim 1, further comprising:

receiving, by the computing device and during a normal mode of operation, a user input from the transferor, the user input from the transferor corresponding to activation of the protected mode, wherein activating the protected mode is in response to receiving the user input from the transferor.

9. The method of claim 1, wherein the computing device disables functions of the computing device other than anti-theft and recovery functions while the protected mode is activated.

10. The method of claim 1, wherein activating the protected mode comprises erasing, by the computing device, user generated content stored on the computing device.

11. A computing device comprising:

a memory that stores instructions;

one or more sensors that receive one or more signals associated with the computing device; and one or more processors that execute the instructions to:

receive, from a transferor that intends to convey the computing device to a transferee, one or more signal parameters that, if satisfied, permit the computing device to deactivate a protected mode of operation, the signal parameters associated with the transferee and specifying one or more of: a geographic location, a network identifier, a network address, a network profile, a device identifier, a threshold distance, a time window, or biometric information;

activate, during a normal mode of operation, the protected mode, wherein the computing device disables one or more functions that are enabled during the normal mode of operation while the protected mode is activated;

receive, during the protected mode, a user input from a potential transferee, the user input corresponding to a wake function of the computing device;

responsive to receiving the user input, determine, based on a comparison between the one or more signals detected by the computing device and the one or more signal parameters, whether the computing device is in possession of the transferee;

responsive to determining the computing device is in the possession of the transferee, deactivate the protected mode of operation; and responsive to determining the computing device is not in the possession of the transferee, maintain the protected mode of operation.

12. The computing device of claim 11, wherein the one or more signals are selected from the group consisting of one or more location-based signals, one or more network-based signals, one or more account-based signals, one or more time-based signals, one or more biometric signals, and one or more device-specific signals.

13. The computing device of claim 11, wherein to determine whether the computing device is in possession of the transferee the one or more processors execute the instructions to determine whether the one or more signals satisfy the one or more signal parameters.

14. The computing device of claim 11, wherein the one or more processors execute the instructions to, in response to determining the computing device is not in the possession of the transferee:

output, to the potential transferee, a prompt to input verification information;

receive, from the potential transferee, the verification information; and verify the potential transferee as the transferee based on a comparison between the verification information to stored verification information.

15. The computing device of claim 11, wherein the one or more processors execute the instructions to, in response to determining the computing device is not in the possession of the transferee:

send, to the transferor, a request to confirm that the computing device is in the possession of the transferee;

receive an indication of a response to the request; and verify, based on the indication of the response to the request, the potential transferee as the transferee.

16. The computing device of claim 11, wherein the one or more processors execute the instructions to, in response to determining the computing device is not in the possession of the transferee:

determine a location of the computing device; and send, to the transferor, an indication of the location of the computing device.

17. The computing device of claim 11, wherein the one or more processors execute the instructions to:

receive, during a normal mode of operation, a user input from the transferor, the user input from the transferor corresponding to activation of the protected mode, wherein activating the protected mode is in response to receiving the user input from the transferor.

18. The computing device of claim 11, wherein the computing device disables functions of the computing device other than anti-theft and recovery functions while the protected mode is activated.

19. The computing device of claim 11, wherein to activate the protected mode the one or more processors execute the instructions to erase user generated content stored on the computing device.

20. A non-transitory computer-readable storage medium comprising instructions, that when executed by one or more processors of a computing device, cause the one or more processors to:

receive, from a transferor that intends to convey the computing device to a transferee, one or more signal parameters that, if satisfied, permit the computing device to deactivate a protected mode of operation, the signal parameters associated with the transferee and specifying one or more of: a geographic location, a network identifier, a network address, a network profile, a device identifier, a threshold distance, a time window, or biometric information;

activate, during a normal mode of operation, the protected mode, wherein the computing device disables one or more functions that are enabled during the normal mode of operation while the protected mode is activated;

receive, during the protected mode, a user input from a potential transferee, the user input corresponding to a wake function of the computing device;

responsive to receiving the user input, determine, based on a comparison between one or more signals detected by the computing device and the one or more signal parameters, whether the computing device is in possession of the transferee;

responsive to determining the computing device is in the possession of the transferee, deactivate the protected mode of operation; and responsive to determining the computing device is not in the possession of the transferee, maintain the protected mode of operation.

* * * * *